US012627642B1

(12) United States Patent
Bosworth

(10) Patent No.: US 12,627,642 B1
(45) Date of Patent: May 12, 2026

(54) SELECTIVE ENCRYPTION IN VIRTUAL REALITY

(71) Applicant: Meta Platforms Technologies, LLC, Menlo Park, CA (US)

(72) Inventor: Andrew Garrod Bosworth, San Mateo, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 185 days.

(21) Appl. No.: 17/721,174

(22) Filed: Apr. 14, 2022

(51) Int. Cl.
*H04L 9/40* (2022.01)
*G06T 19/00* (2011.01)
*H04L 67/131* (2022.01)

(52) U.S. Cl.
CPC ........ *H04L 63/0478* (2013.01); *G06T 19/006* (2013.01); *H04L 67/131* (2022.05)

(58) Field of Classification Search
None
See application file for complete search history.

(56) References Cited

U.S. PATENT DOCUMENTS

| 2009/0282472 A1* | 11/2009 | Hamilton, II | ....... H04L 63/0428 726/15 |
| 2021/0099433 A1* | 4/2021 | Soryal | ................ H04N 21/8166 |
| 2021/0334397 A1* | 10/2021 | Taylor | ....................... G06F 3/14 |
| 2023/0262201 A1* | 8/2023 | Gilad | ................. H04N 21/4307 709/231 |

* cited by examiner

*Primary Examiner* — Kevin S Mai
(74) *Attorney, Agent, or Firm* — Potomac Law Group, PLLC; Dannon G. Allbee

(57) ABSTRACT

Various aspects of the subject technology relate to systems, methods, and machine-readable media for selective encryption in a shared artificial reality environment. Various aspects may include determining contextual information of the shared artificial reality environment. Aspects may also include encrypting communication in the environment into encrypted channels and non-encrypted channels based on the contextual information. Aspects may also include determining a correlation between the encrypted channels and the non-encrypted channels. Aspects may also include applying, based on the correlation, a partial encryption to the non-encrypted channels for obscuring a cryptographic code of the communication. Aspects may include determining a recombination of the encrypted channels and the non-encrypted channels based on clock skew.

19 Claims, 11 Drawing Sheets

SELECTIVE ENCRYPTION IN VIRTUAL REALITY

TECHNICAL FIELD

The present disclosure generally relates to selective encryption in computer generated shared artificial reality environments, and more particularly to partial encryption of information communicated in such environments based on correlation of sensitive and non-sensitive elements and/or contextual information.

BACKGROUND

Interaction in a computer generated shared artificial reality environment involves interaction with various types of artificial reality/virtual content, elements, and/or applications in the shared artificial reality environment. Users of the shared artificial reality environment may interact with both sensitive and non-sensitive information in the shared artificial reality environment or in another general communication environment. For example, a conversation or portion thereof occurring in the environment may be confidential while visual elements of the artificial reality or communication elements may be non-sensitive. Accordingly, aspects of the artificial reality or communication environment may be organized into encrypted and non-encrypted channels. Due to the need for varying levels of encryption in the environment, timing may be managed so that the encrypted and non-encrypted channels are recombined effectively for advantageous implementation of partial encryption in the environment, depending on the sensitivity of elements contained within the environment.

BRIEF SUMMARY

The subject disclosure provides for systems and methods for selective encryption in a shared artificial reality environment (e.g., shared virtual reality environment) or other communication environment. The selective encryption can be applied selectively to elements in the environment that are actually decrypted, such as audio of a conversation in a virtual environment that is decrypted at a client device, which may address technical limitations of processing capability for encryption in a shared multiple device setting. The encryption can be based on contextual information, such as pertaining to virtual elements or other environment elements which can be indicative of the sensitivity of information. As an example, a user or user representation may be located in a virtual home environment of the artificial reality environment and engaged in a private conversation with another user/user representation that should be encrypted, but other virtual elements such as decorations (e.g., banners) of the virtual home environment may be non-sensitive and consequently not subject to encryption. In this way, users may advantageously experience dynamic encryption that is contextually dependent on what the environmental context and/or user indicates to be sensitive. For example, the contextual information may include device status (e.g., battery, connectivity) for connecting to the environment, user preferences, virtual object characteristics, and/or the like. The server and client device used to connect the user to the environment may synchronize the timing of recombining the encrypted and non-encrypted channels for achieving the dynamic encryption. Dynamic or selective encryption may advantageously reduce the processing cost and time necessary to enhance the security of communication in the environment.

The subject disclosure also may provide selective encryption in a way that reduces the risk of reverse engineering the encryption for unauthorized decryption by a malicious actor. As an example, in the artificial reality environment, if audio channels containing audio from a conversation in the artificial reality environment are encrypted, then the corresponding facial animation for the conversation may also be distorted or partially encrypted. As such, a correlation between encrypted and non-encrypted elements within the environment may be determined for applying additional partial encryption. The additional encryption may be based on the contextual information. In general, the additional encryption advantageously can be applied to unencrypted elements that are not the same as an encrypted element but could reveal (e.g., inadvertently) information about the encrypted element. In this way, the application of additional partial encryption (e.g., visual fuzzing or distortion) based on correlation and/or contextual information advantageously may increase the security of encryption against attempts to obtain encrypted information by the malicious actor.

According to one embodiment of the present disclosure, a computer-implemented method for selective encryption in a shared artificial reality environment is provided. The method includes determining contextual information of the shared artificial reality environment. The method also includes encrypting communication in the shared artificial reality environment into encrypted channels and non-encrypted channels based on the contextual information. The method also includes determining a correlation between the encrypted channels and the non-encrypted channels. The method also includes applying, based on the correlation, a partial encryption to the non-encrypted channels for obscuring a cryptographic code of the communication. The method also includes determining a recombination of the encrypted channels and the non-encrypted channels based on clock skew.

According to one embodiment of the present disclosure, a system is provided including a processor and a memory comprising instructions stored thereon, which when executed by the processor, causes the processor to perform a method for selective encryption in a shared artificial reality environment. The method includes determining contextual information of the shared artificial reality environment. The method also includes encrypting communication in the shared artificial reality environment into encrypted channels and non-encrypted channels based on the contextual information. The method also includes determining a correlation between the encrypted channels and the non-encrypted channels. The method also includes applying, based on the correlation, a partial encryption to the non-encrypted channels for obscuring a cryptographic code of the communication. The method also includes determining a recombination of the encrypted channels and the non-encrypted channels based on clock skew.

According to one embodiment of the present disclosure, a non-transitory computer-readable storage medium is provided including instructions (e.g., stored sequences of instructions) that, when executed by a processor, cause the processor to perform a method for selective encryption in a shared artificial reality environment. The method includes determining contextual information of the shared artificial reality environment. The method also includes encrypting communication in the shared artificial reality environment into encrypted channels and non-encrypted channels based on the contextual information. The method also includes determining a correlation between the encrypted channels and the non-encrypted channels. The method also includes applying, based on the correlation, a partial encryption to the non-encrypted channels for obscuring a cryptographic code of the communication. The method also includes determining a recombination of the encrypted channels and the non-encrypted channels based on clock skew.

According to one embodiment of the present disclosure, a non-transitory computer-readable storage medium is provided including instructions (e.g., stored sequences of instructions) that, when executed by a processor, cause the processor to perform a method for selective encryption in a shared artificial reality environment. The method includes determining a quantity of user representations or location within the shared artificial reality environment. The method also includes determining contextual information of the shared artificial reality environment based on the quantity of user representations or location. The method also includes encrypting communication in the shared artificial reality environment into encrypted channels and non-encrypted channels based on the contextual information. The method also includes determining a correlation between the encrypted channels and the non-encrypted channels. The method also includes identifying, via the correlation, sensitive spatial or audio information in the non-encrypted channels. The method also includes applying, based on the correlation, a partial encryption to the non-encrypted channels for obscuring a cryptographic code of the communication. The method also includes determining a recombination of the encrypted channels and the non-encrypted channels based on clock skew.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
FIG. 1 is a block diagram of a device operating environment with which aspects of the subject technology can be implemented.
Figure 1:
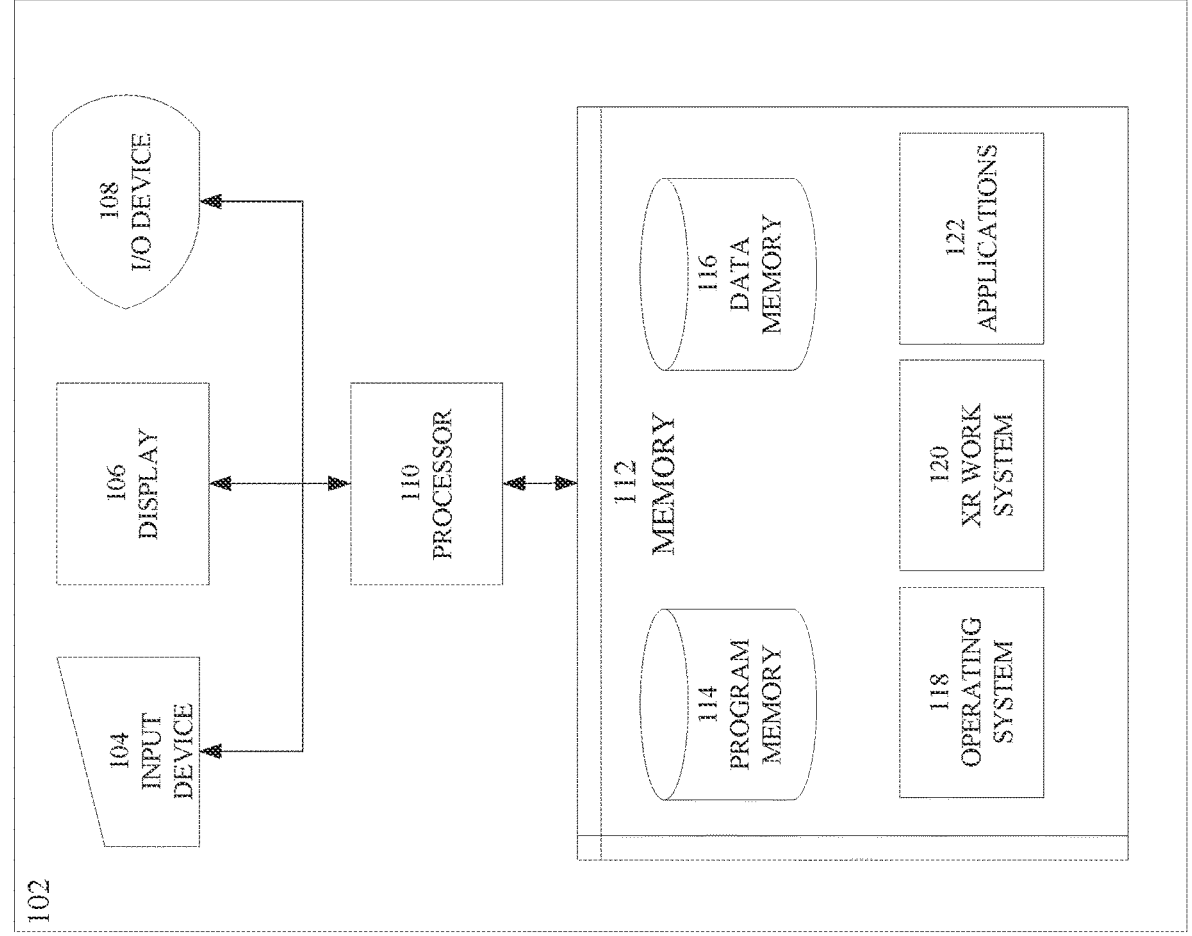

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The disclosed system addresses a problem in artificial reality tied to computer technology, namely, the technical problem of real time encryption (e.g., end-to-end encryption) within a computer generated shared artificial reality environment or other communication environment. A client device may not possess the computing or processing capability necessary to encrypt complex elements in the environment, such as a large quantity of users conversing with each other. However, encryption requirement may pose a challenge to encryption from a remote computing server. The disclosed system solves this technical problem by providing a solution also rooted in computer technology, namely, by providing selective encryption such as of channels between the client side and the server side. As an example, in the environment, a client device may encrypt multiple audio channels while a remote server performs computer rendering or image synthesis/generation corresponding to the audio channels. In particular, this architecture may involve partial encryption, such as by visually distorting (e.g., fuzzing) facial or animated spatial features in the environment that may unintentionally reveal encrypted information in the multiple audio channels.

The disclosed system improves the functioning of the computer system used to generate the artificial reality environment and computer-based encryption because it enables the computer system to improve at least partially encrypted communication between an artificial reality compatible user device(s) and server(s) of the computing system. As an example, the disclosed system may facilitate a selective encryption communication environment while safeguarding against reverse engineering encrypted audio channels based on corresponding facial animation (e.g., when the audio channels are being decrypted). The present invention is integrated into a practical application of applying targeted encryption based on contextual information indicative of correlations between elements in the artificial reality or communication environment. This advantageously increases computer system security and encryption in such environments such as based on correlations between unencrypted elements/information and encrypted elements/information from being used by malicious actors for unauthorized acquisition of encrypted data.

Aspects of the present disclosure are directed to creating and administering artificial reality environments. For example, an artificial reality environment may be a shared artificial reality environment, a virtual reality (VR), an augmented reality environment, a mixed reality environment, a hybrid reality environment, a non immersive environment, a semi immersive environment, a fully immersive environment, and/or the like. The artificial environments may also include artificial collaborative gaming, working, and/or other environments which include modes for interaction between various people or users in the artificial environments. The artificial environments of the present disclosure may provide elements that enable users to navigate (e.g., scroll) in the environments via function expansions in the user's wrist, such as via pinching, rotating, tilting, and/or the like. For example, the degree that the user's wrist is tilted can correspond to how quickly a scrollable list is scrolled through in the artificial environments (e.g., more tilt results in faster scrolling while less tilt results in slower scrolling). As used herein, "real-world" objects are non-computer generated and artificial or VR objects are computer generated. For example, a real-world space is a physical space occupying a location outside a computer and a real-world object is a physical object having physical properties outside a computer. For example, an artificial or VR object may be rendered and part of a computer-generated artificial environment.

Embodiments of the disclosed technology may include or be implemented in conjunction with an artificial reality system. Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some implementations, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR." as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. AR also refers to systems where light entering a users' eye is partially generated by a computing system and partially composes light reflected off objects in the real world. For example, an AR headset could be shaped as a pair of glasses with a pass-through display, which allows light from the real-world to pass through a waveguide that simultaneously emits light from a projector in the AR headset, allowing the AR headset to present virtual objects intermixed with the real objects the user can see. The AR headset may be a block-light headset with video pass-through. "Artificial reality," "extra reality," or "XR," as used herein, refers to any of VR, AR, MR, or any combination or hybrid thereof.

Several implementations are discussed below in more detail in reference to the figures. FIG. 1 is a block diagram of a device operating environment 100 with which aspects of the subject technology can be implemented. The device operating environment can comprise hardware components of a computing system 100 that can create, administer, and provide interaction modes for a shared artificial reality environment (e.g., collaborative artificial reality environment) such as for communication via XR or other communication elements. The interaction modes can include various modes for various audio conversation, textual messaging, communicative gestures, control modes, and other communicative interaction, etc. for each user of the computing system 100. In various implementations, the computing system 100 can include a single computing device or multiple computing devices 102 that communicate over wired or wireless channels to distribute processing and share input data.

In some implementations, the computing system 100 can include a stand-alone headset capable of providing a computer created or augmented experience for a user without the need for external processing or sensors. In other implementations, the computing system 100 can include multiple computing devices 102 such as a headset and a core processing component (such as a console, mobile device, or server system) where some processing operations are performed on the headset and others are offloaded to the core processing component. Example headsets are described below in relation to FIGS. 2A-2B. In some implementations, position and environment data can be gathered only by sensors incorporated in the headset device, while in other implementations, one or more of the non-headset computing devices 102 can include sensor components that can track environment or position data, such as for implementing computer vision functionality. Additionally or alternatively, such sensors can be incorporated as wrist sensors, which can function as a wrist wearable for detecting or determining user input gestures. For example, the sensors may include inertial measurement units (IMUs), eye tracking sensors, electromyography (e.g., for translating neuromuscular signals to specific gestures), time of flight sensors, light/optical sensors, and/or the like to determine the inputs gestures, how user hands/wrists are moving, and/or environment and position data.

The computing system 100 can include one or more processor(s) 110 (e.g., central processing units (CPUs), graphical processing units (GPUs), holographic processing units (HPUs), etc.) The processors 110 can be a single processing unit or multiple processing units in a device or distributed across multiple devices (e.g., distributed across two or more of computing device 102s). The computing system 100 can include one or more input devices 104 that provide input to the processors 110, notifying them of actions. The actions can be mediated by a hardware controller that interprets the signals received from the input device 104 and communicates the information to the processors 110 using a communication protocol. As an example, the hardware controller can translate signals from the input devices 104 to simulate click moment or flip momentum with respect to XR scrolling, such as based on a transfer function. Each input device 104 can include, for example, a mouse, a keyboard, a touchscreen, a touchpad, a wearable input device (e.g., a haptics glove, a bracelet, a ring, an carring, a necklace, a watch, etc.), a camera (or other light-based input device, e.g., an infrared sensor), a microphone, and/or other user input devices.

The processors 110 can be coupled to other hardware devices, for example, with the use of an internal or external bus, such as a PCI bus, SCSI bus, wireless connection, and/or the like. The processors 110 can communicate with a hardware controller for devices, such as for a display 106. The display 106 can be used to display text and graphics. In some implementations, the display 106 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and/or the like. Other I/O devices 108 can also be coupled to the processor, such as a network chip or card, video chip or card, audio chip or card, USB, firewire or other external device, camera, printer, speakers, CD-ROM drive, DVD drive, disk drive, etc.

The computing system 100 can include a communication device capable of communicating wirelessly or wire-based with other local computing devices 102 or a network node. The communication device can communicate with another device or a server through a network using, for example, TCP/IP protocols. The computing system 100 can utilize the communication device to distribute operations across multiple network devices. For example, the communication device can function as a communication module. The communication device can be configured to transmit or receive input gestures for determining navigation commands in XR environments or for XR objects (e.g., comprising scrollable lists).

The processors 110 can have access to a memory 112, which can be contained on one of the computing devices 102 of computing system 100 or can be distributed across one of the multiple computing devices 102 of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. The memory 112 can include program memory 114 that stores programs and software, such as an operating system 118, XR work system 120, and other application programs 122 (e.g., XR games). The memory 112 can also include data memory 116 that can include information to be provided to the program memory 114 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, and/or the like.

Figure 2A:
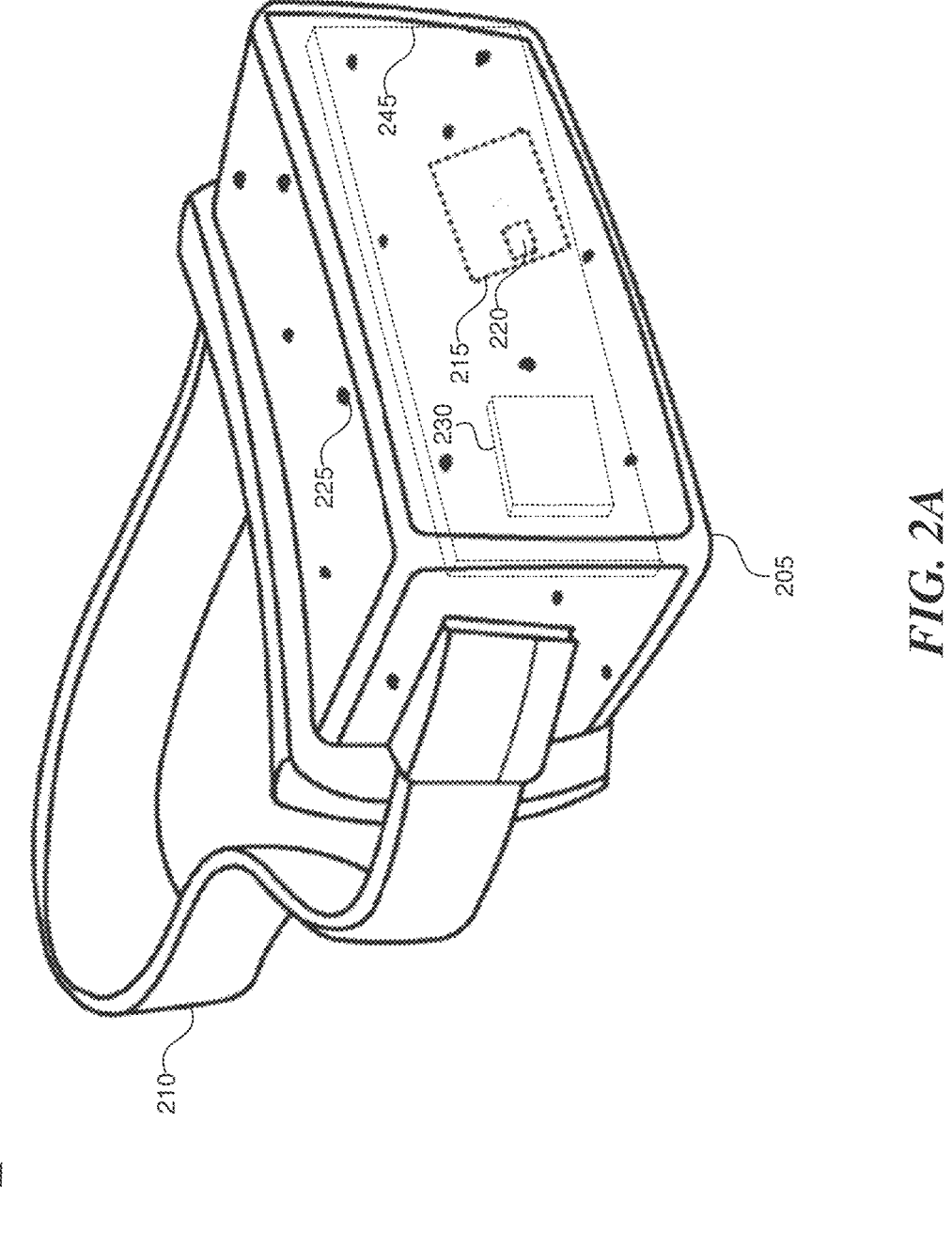
FIGS. 2A-2B are diagrams illustrating virtual reality headsets, according to certain aspects of the present disclosure.
Figure 2B:
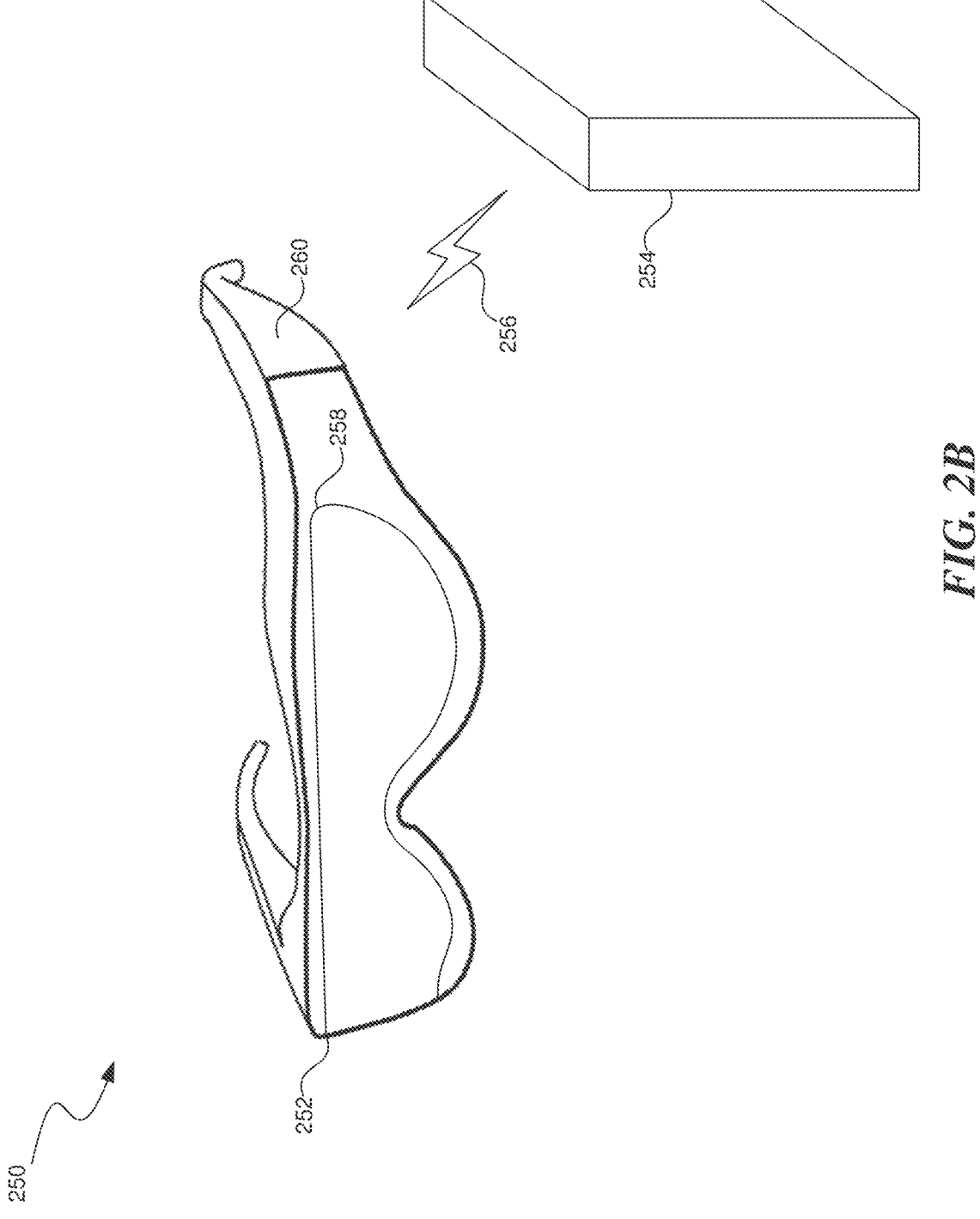

FIGS. 2A-2B are diagrams illustrating virtual reality headsets, according to certain aspects of the present disclosure. FIG. 2A is a diagram of a virtual reality head-mounted display (HMD) 200. The HMD 200 includes a front rigid body 205 and a band 210. The front rigid body 205 includes one or more electronic display elements such as an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF), six degrees of freedom (6DoF), etc. For example, the locators 225 can emit infrared light beams which create light points on real objects around the HMD 200. As another example, the IMU 215 can include, e.g., one or more accelerometers, gyroscopes, magnetometers, other non-camera-based position, force, or orientation sensors, or combinations thereof. One or more cameras (not shown) integrated with the HMD 200 can detect the light points, such as for a computer vision algorithm or module. The compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

FIG. 2B is a diagram of a mixed reality HMD system 250 which includes a mixed reality HMD 252 and a core processing component 254. The mixed reality HMD 252 and the core processing component 254 can communicate via a wireless connection (e.g., a 60 GHZ link) as indicated by the link 256. In other implementations, the mixed reality system 250 includes a headset only, without an external compute device or includes other wired or wireless connections between the mixed reality HMD 252 and the core processing component 254. The mixed reality system 250 may also include a wrist wearable, such as for converting wrist input gestures into navigation commands for scrolling in XR environments or communication in the virtual environment or other communication environment. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc. The electronic components may be configured to implement computing vision-based hand tracking for translating hand movements and positions to XR navigation or selection commands.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the users' eye. The output light can mix with light that passes through the display 258, allowing the output light to present virtual objects that appear as if they exist in the real-world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects For example, the HMD system 250 can track the motion and position of the user's wrist movements as input gestures for performing navigation such as scrolling of XR objects in a manner that is mapped to the input gestures. As an example, the HMD system 250 may include a coordinate system to track the relative hand positions for each user for determining how the user desires to scroll through, manipulate XR elements, and/or interact with the artificial reality environment. In this way, the HMD system 250 can enable users to have a natural response and intuitive sense of controlled interaction with their hands.

Figure 2C:
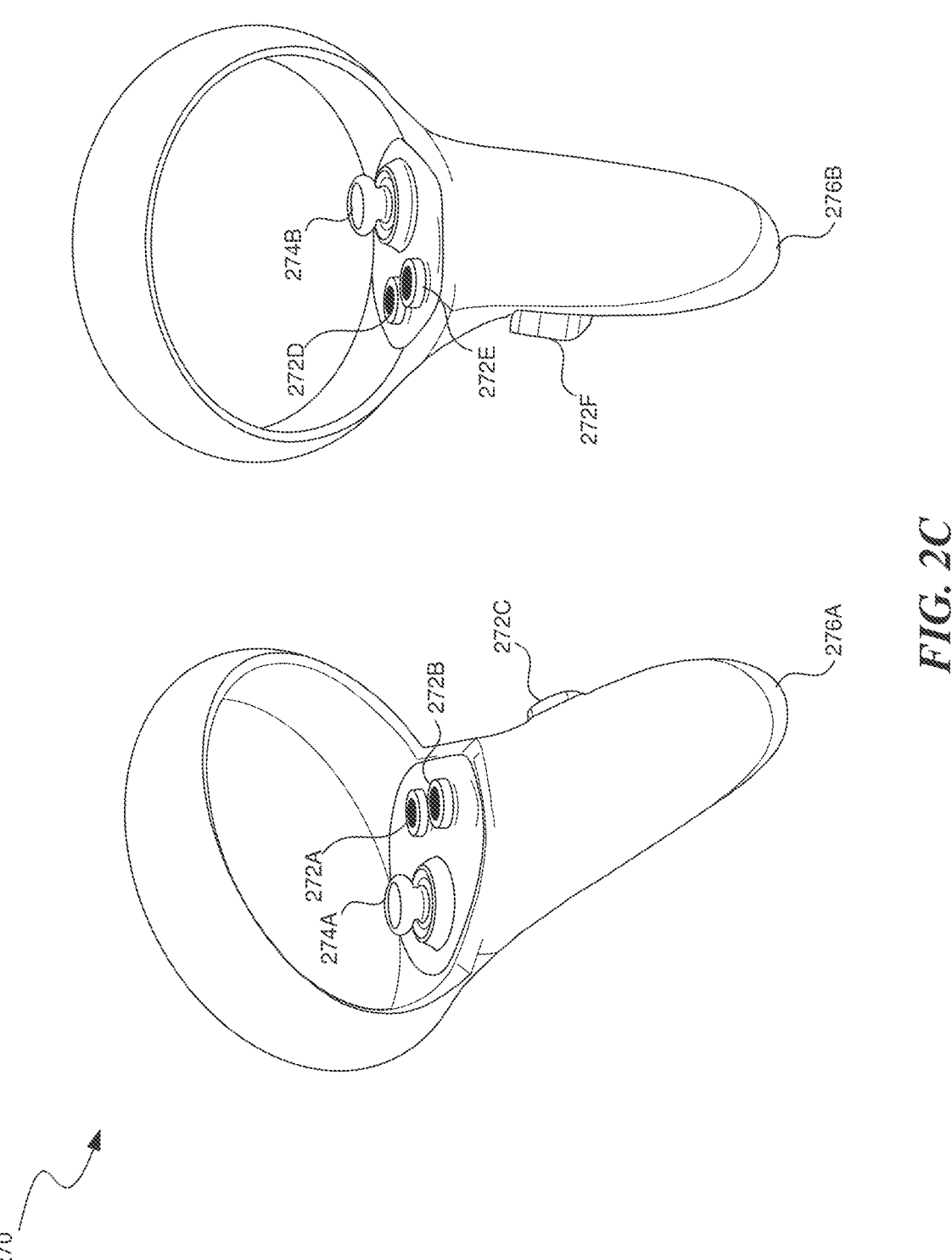
FIG. 2C illustrates controllers for interaction with an artificial reality environment, according to certain aspects of the present disclosure.

FIG. 2C illustrates controllers 270a-270b, which, in some implementations, a user can hold in one or both hands to interact with an artificial reality environment presented by the HMD 200 and/or HMD 250. The controllers 270a-270b can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. For example, the compute units 230 can use the monitored hand positions to implement position control, rate control, nudges, and/or a combination thereof for navigation, selection of settings, or other type of interaction in the shared artificial reality environment.

The compute units 230 may, via the IMU outputs (or other sensor outputs via the controllers 270a-270b), compute a change in position of the user's hand for defining an input gesture. For example, the compute units 230 may implement computer vision/sensor-based hand tracking for determining that a user input as a navigation command or other method of XR interaction. The compute units 230 can also compute the change in position of the user's hand for tracking other types of hand/wrist input gestures, such as for XR interaction. The controllers 270a-270b can also include various buttons (e.g., buttons 272A-F) and/or joysticks (e.g., joysticks 274A-B), which a user can actuate to provide input and interact with objects. As discussed below, controllers 270a-270b can also have tips 276A and 276B, which, when in scribe controller mode, can be used as the tip of a writing implement in the artificial reality environment. In various implementations, the HMD 200 or 250 can also include additional subsystems, such as a hand tracking unit, an eye tracking unit, an audio system, various network components, etc. to monitor indications of user interactions and intentions. For example, in some implementations, instead of or in addition to controllers, one or more cameras included in the HMD 200 or 250, or from external cameras, can monitor the positions and poses of the users' hands to determine gestures and other hand and body motions.

Figure 3:
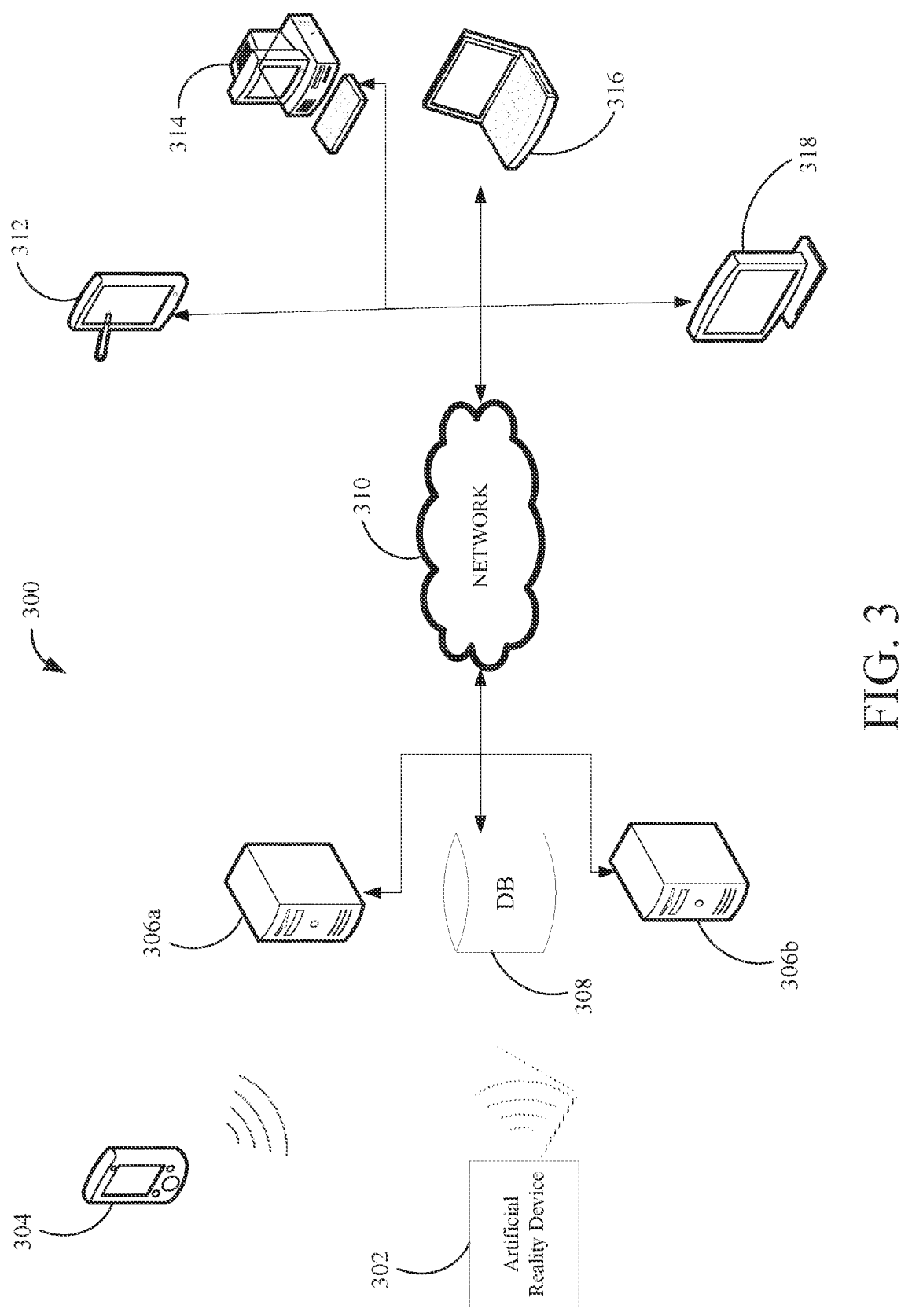
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices, such as artificial reality device 302, mobile device 304, tablet 312, personal computer 314, laptop 316, desktop 318, and/or the like. The artificial reality device 302 may be the HMD 200, HMD system 250, a wrist wearable, or some other XR device that is compatible with rendering or interacting with an artificial reality or virtual reality environment. The artificial reality device 302 and mobile device 304 may communicate wirelessly via the network 310. In some implementations, some of the client computing devices can be the HMD 200 or the HMD system 250. The client computing devices can operate in a networked environment using logical connections through network 310 to one or more remote computers, such as a server computing device. Content (e.g., for communication in a shared artificial reality or communication environment) can be provided to the client computing devices via an end-to-end encrypted channel and a non-encrypted channel operated by the server computing device. In addition, the client computing devices may use a synchronized clock mechanism (e.g., addressing clock skew between the different channel paths relative to client and server) to recombine the encrypted channel and non-encrypted channel (from the server computing device), such as involving time stamp exchanges.

In some implementations, the environment 300 may include a server such as an edge server which receives client requests and coordinates fulfillment of those requests through other servers. The server may include the server computing devices 306a-306b, which could also logically form a single server. Alternatively, the server computing devices 306a-306b may each be a distributed computing environment encompassing multiple computing devices located at the same or at geographically disparate physical locations. The client computing devices and server computing devices 306a-306b can each act as a server or client to other server/client device(s). The server computing devices 306a-306b can connect to a database 308 or can comprise its own memory. Each server computing devices 306a-306b can correspond to a group of servers, and each of these servers can share a database or can have their own database. The database 308 may logically form a single unit or may be part of a distributed computing environment encompassing multiple computing devices that are located within their corresponding server, located at the same, or located at geographically disparate physical locations.

The client computing devices and the server computing devices 306a-306b may be in operative communication to separate portions of otherwise integrated content of the XR or communication environment. As an example, the integrated content can be separated into audio, video, and/or XR animation streams as well as sensitive (e.g., encrypted) and non-sensitive (e.g., non-encrypted) streams. The separation of the integrated content can be performed via keyframing or tagging and can be based on contextual information such as correlations between XR elements in the environment. As an example, based on audio from a conversation being sensitive, an audio stream can be part of an encrypted channel, a mouth animation stream from one of the user representations involved in the conversation can be part of a different encrypted channel, and an eye animation stream may be an unencrypted channel. The various streams/channels can be recombined at the corresponding client computing devices with the synchronized clock mechanism being configured to ensure that the various channels are recombined accurately and effectively. The contextual information may be stored in the database 308 and may comprise information such as location, type of XR element being rendered, quantity of participants in an encrypted conversation, context information, correlation between encrypted and unencrypted elements, and/or the like. The client computing devices may receive graphical user elements including pop-ups and configurable privacy settings so that users may opt out of collection of contextual information by the server computing devices 306a-306b. In some embodiments, unencrypted channels may be end-to-end encrypted and directly sent to the XR compatible client device (of the client computing devices) used to connect to the shared XR environment while encrypted channels are sent to the server computing devices 306a-306b for processing before being sent to the client.

The network 310 can be a local area network (LAN), a wide area network (WAN), a mesh network, a hybrid network, or other wired or wireless networks. The network 310 may be the Internet or some other public or private network. Client computing devices can be connected to network 310 through a network interface, such as by wired or wireless communication. The connections can be any kind of local, wide area, wired, or wireless network, including the network 310 or a separate public or private network. In some implementations, the server computing devices 306a-306b can be used as part of a social network such as implemented via the network 310. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc.

Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea. A social networking system can enable a user to enter and display information related to the user's interests, age/date of birth, location (e.g., longitude/latitude, country, region, city, etc.), education information, life stage, relationship status, name, a model of devices typically used, languages identified as ones the user is familiar with, occupation, contact information, or other demographic or biographical information in the users' profile. Any such information can be represented, in various implementations, by a node or edge between nodes in the social graph.

A social networking system can enable a user to upload or create pictures, videos, documents, songs, or other content items, and can enable a user to create and schedule events. Content items can be represented, in various implementations, by a node or edge between nodes in the social graph. A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news website might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels (e.g., encrypted, non-encrypted, or partially encrypted) to users. For example, a social networking system can enable a user to email, instant message, or text/SMS message, one or more other users. It can enable a user to post a message to the user's wall or profile or another user's wall or profile. It can enable a user to post a message to a group or a fan page. It can enable a user to comment on an image, wall post or other content item created or uploaded by the user or another user. And it can allow users to interact (via their avatar or true-to-life representation) with objects or other avatars in a virtual environment (e.g., in an artificial reality working environment), etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment where users can communicate and interact via avatars or other digital representations of themselves. Further, a first user can comment on the profile page of a second user or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identifies a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

Figure 4:
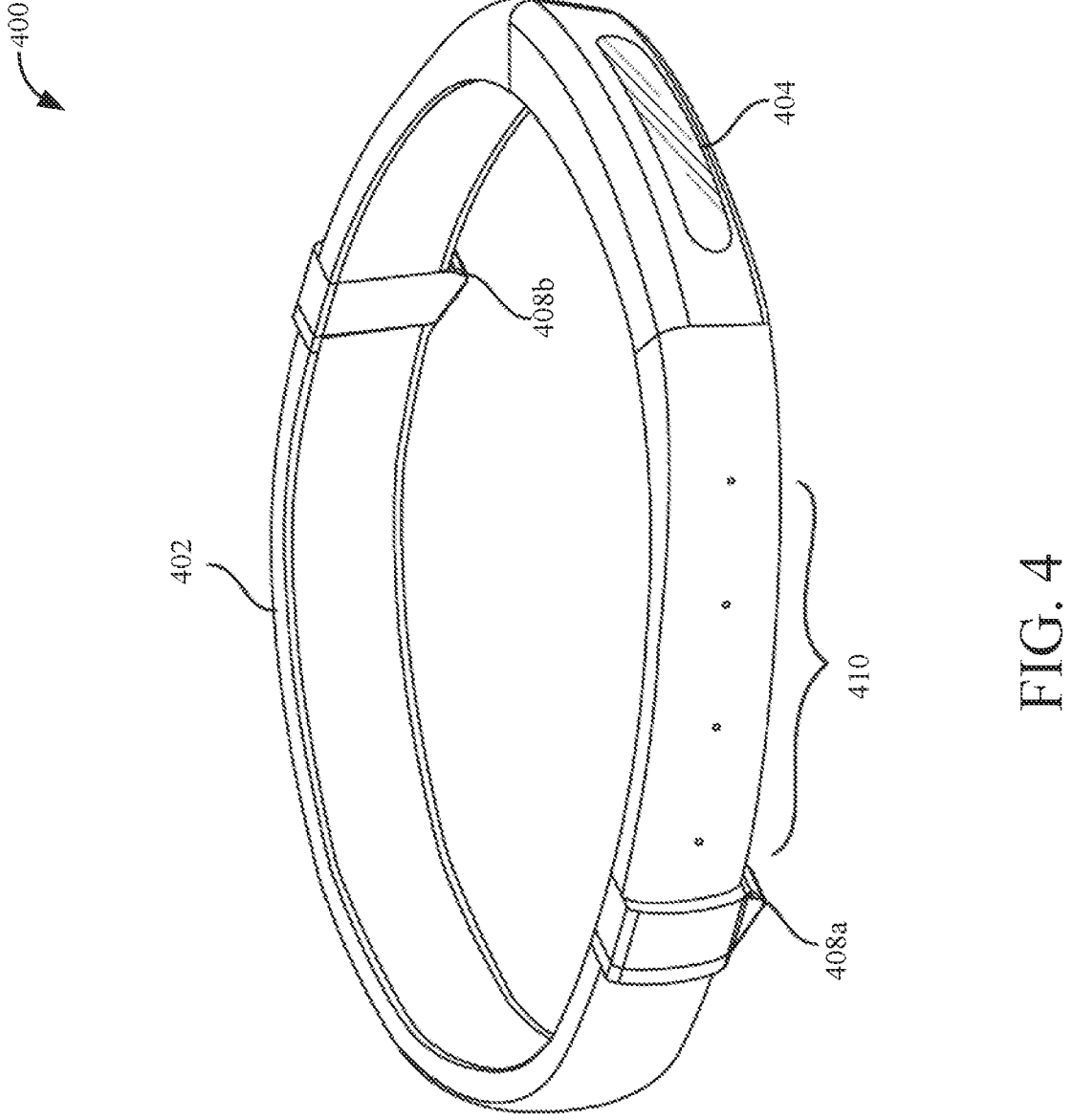
FIG. 4 illustrates an example artificial reality wearable, according to certain aspects of the present disclosure.

FIG. 4 illustrates an example artificial reality wearable, according to certain aspects of the present disclosure. For example, the artificial reality wearables can be a wrist wearable such as an XR wrist sensor 400. The wrist sensor 400 may be configured to sense position and movement of a user's hand in order to translate such sensed position and movement into input gestures. For example, the input gestures may be micro movements of the user's wrist. As an example, the wrist movements may include rotation, pinching, holding downward, holding upward, sliding, flicking, other suitable wrist movements, etc. The XR wrist sensor 400 may generally represent a wearable device dimensioned to fit about a body part (e.g., a wrist) of the user. As shown in FIG. 4, the XR wrist sensor 400 may include a frame 402 and a sensor assembly 404 that is coupled to frame 402 and configured to gather information about a local environment by observing the local environment.

The sensor assembly 404 can include cameras, IMU eye tracking sensors, electromyography (EMG) sensors, time of flight sensors, light/optical sensors, and/or the like to track wrist movement. The XR wrist sensor 400 may also include one or more audio devices, such as output audio transducers 408a-408b and input audio transducers 410. The output audio transducers 408a-408b may provide audio feedback and/or content to the user while the input audio transducers 410 may capture audio in the user's environment. The XR wrist sensor 400 may also include other types of screens or visual feedback devices (e.g., a display screen integrated into a side of frame 402). In some embodiments, the wrist wearable 400 can instead take another form, such as head bands, hats, hair bands, belts, watches, ankle bands, rings, neckbands, necklaces, chest bands, eyewear frames, and/or any other suitable type or form of apparatus. Other forms of the XR wrist sensor 400 may be different wrist bands with a different ornamental appearance than the XR wrist sensor 400 but perform a similar function.

Figure 5:
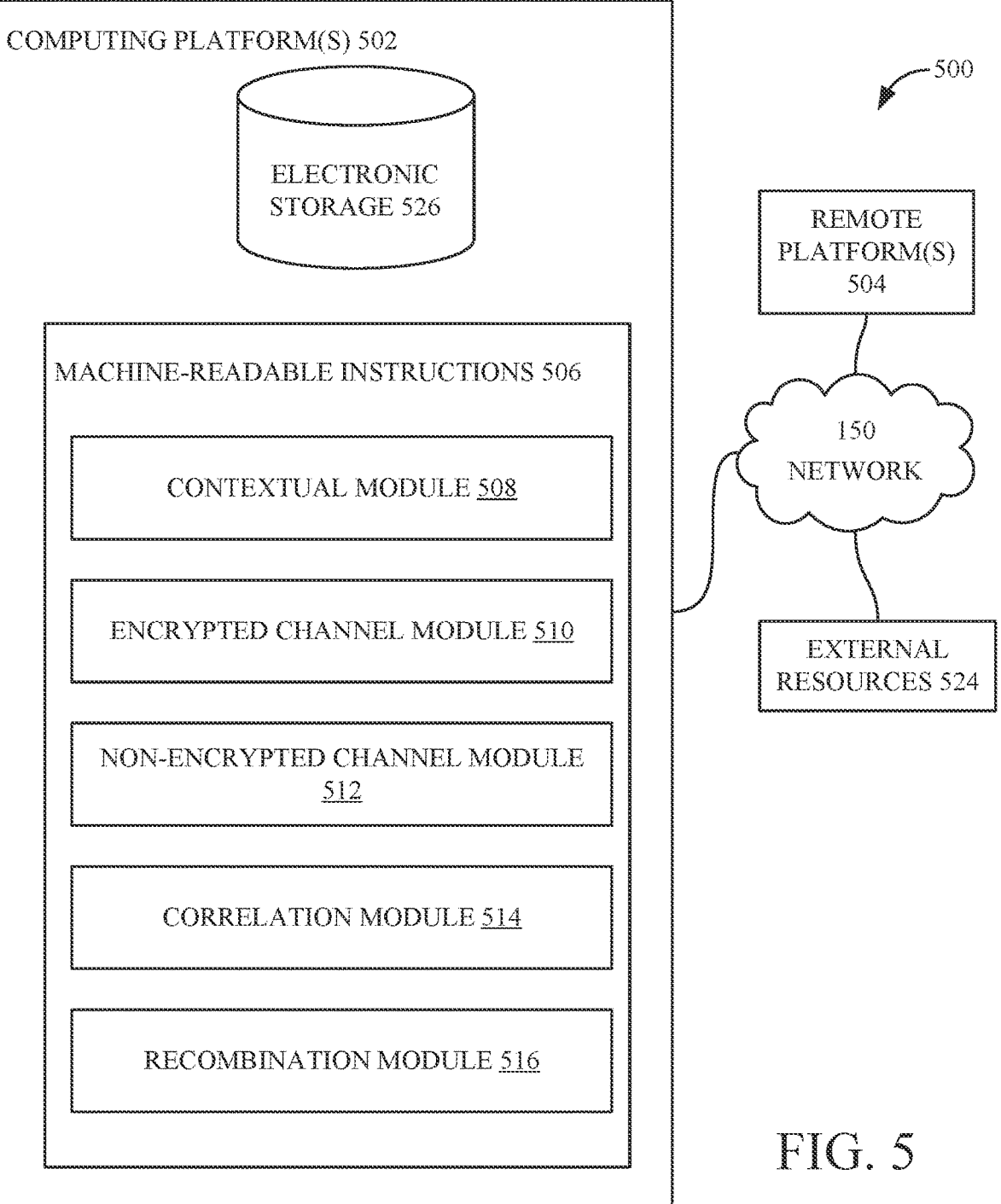
FIG. 5 is a block diagram illustrating an example computer system (e.g., representing both client and server) with which aspects of the subject technology can be implemented.

FIG. 5 is a block diagram illustrating an example computer system 500 (e.g., representing both client and server) with which aspects of the subject technology can be implemented. The system 500 may be configured for selective encryption in a shared artificial reality environment, according to certain aspects of the disclosure. In some implementations, the system 500 may include one or more computing platforms 502. The computing platform(s) 502 can correspond to a server component of an artificial reality/XR platform or other communication platform, which can be similar to or the same as the server computing devices 306a-306b of FIG. 3 and include the processor 110 of FIG. 1. The computing platform(s) 502 can be configured to store, receive, determine, and/or analyze user preferences (e.g., communication preferences) and/or user information to improve the security of interaction with the shared artificial reality environment. Users may opt-in or opt-out of determination of user preferences and/or information by the computing platforms(s) 502. Such user preferences and/or information may be used only for improving the privacy of user interactions within the environment. For example, the computing platform(s) 502 may be configured to execute algorithm(s) to determine what portions of content should be separated for encryption and recombined at an XR compatible client device (e.g., HMD 200, HMD system 250) to implement selective encryption in the shared artificial reality environment. The computing platform(s) 502 may also determine which unencrypted elements correlated with other encrypted elements being decrypted should be at least partially obscured (e.g., visually fuzzed animation, monotone rendered voice rather than audio of conversation).

The computing platform(s) 502 can maintain or store data, such as in the electronic storage 526, including correlation and contextual data used by the computing platform(s) 502 to determine how to split communicated content in the environment into sensitive (e.g., confidential) and non-sensitive channels as well as what non-sensitive elements should be subject to a privacy filter (e.g., visual fuzzing as a partial encryption to a non-encrypted element). The computing platform(s) 502 may be configured to communicate with one or more remote platforms 504 according to a client/server architecture, a peer-to-peer architecture, and/or other architectures. The remote platform(s) 504 may be configured to communicate with other remote platforms via computing platform(s) 502 and/or according to a client/server architecture, a peer-to-peer architecture, and/or other architectures. Users may access the system 500 hosting the shared artificial reality environment and/or personal artificial reality via remote platform(s) 504. In this way, the remote platform(s) 504 can be configured to cause output of the shared artificial reality environment on client device(s) of the remote platform(s) 504 with selection encryption of XR or other elements (e.g., based on analysis by the computing platform(s) 502 according to the stored data), such as via the HMD 200, HMD system 250, and/or controllers 270a-270b of FIG. 2C. As an example, the remote platform(s) 504 can access artificial reality content and/or artificial reality applications for use in the shared artificial reality for the corresponding user(s) of the remote platform(s) 504, such as via the external resources 524. The computing platform(s) 502, external resources 524, and remote platform(s) 504 may be in communication and/or mutually accessible via the network 150.

The computing platform(s) 502 may be configured by machine-readable instructions 506. The machine-readable instructions 506 may be executed by the computing platform(s) to implement one or more instruction modules. The instruction modules may include computer program modules. The instruction modules being implemented may include one or more of contextual module 508, encrypted channel module 510, non-encrypted channel module 512, correlation module 514, recombination module 516, and/or other instruction modules.

As discussed herein, the contextual module 508 can determine, analyze, store, host, send, receive, or otherwise manipulate contextual data for the shared XR or communication environment, such as for each XR compatible device of the remote platforms(s) 504. The contextual information can include location, actions being taken, features of a user representation, types or identities of XR elements in the XR environment, types of or mechanisms used for content being communicated, correlations between sensitive and non-sensitive elements (e.g., non-encrypted elements that may be improperly used to reveal information about related encrypted elements), type of hardware device, type of software being executed, type of virtual environment involved, identities of user representations involved, and/or the like. The XR compatible device used to access the environment can be or include HMDs 200, 250, wrist wearable 400, or some other type of XR applicable device. Although the description of the shared environment herein includes descriptions of XR features, the environment could also be a general computer-based communication environment such as a gaming environment or messaging environment that does not include XR features.

The contextual module 508 can be in communication with the electronic storage 526 for sending and storing contextual information. For example, if a user/user representation connected to the XR environment is located in a home environment such as a virtual home of the user representation, information about the home environment can be contextual information that informs what type of expectation of privacy the user enjoys. As such, in the home environment, the audio of conversation conducted between the user and other users/user representations may be encrypted (e.g., end-to-end encrypted). Additionally or alternatively, the rendered mouth movements of the user representations involved in a conversation conducted at the home environment can be subject to a privacy filter such as visual distortions or fuzzing of lips, mouth movements corresponding to monotone sounds, or other manipulations to prevent visual animation in the XR environment from revealing information about such a sensitive/encrypted conversation.

In general, the location indicated by contextual information can inform how much selective encryption should be applied, such as to conversations conducted in the corresponding environment. For example, public areas such as a virtual park or virtual public beach may be subject to a low level of (or non-existent) encryption while semi-public areas such as virtual work spaces may have partial encryption according to the expectations of the owners/operators of the work spaces, and private areas such as virtual private rooms or virtual homes can be subject to a high level of encryption. As an example, the contextual information can also inform selective encryptions such as based on a quantity of user representations in a virtual area. For example, if the quantity of user representations exceeds a threshold, then some or significant encryption may be applied while if the threshold is not exceeded then little to no encryption may be applied.

The encrypted channel module 510 may implement one or more streams or channels of data or information that is encrypted, such as end-to-end encrypted or partially filtered/encrypted. As an example, the encrypted channel module 510 can encrypt portions of integrated content of or communicated via the environment. The integrated content may be split by the computing platform(s) 502 such that the encrypted channel module 510 may receive, determine, and/or compile sensitive channels of content via the split content. For example, the encrypted channel module 510 can use keyframing to separate or form encrypted channels of audio, video, animation, or other types of content streams/channels. As an example, the encrypted channel module 510 can use keyframe markers to define the beginning and end of a digital sequence of the XR content being rendered, such as a digital facial animation sequence, audio sequence, XR video sequence, hand gesture sequence, and/or the like. In this way, the encrypted channel module 510 may send sensitive or encrypted channels to the remote platform(s) 504 based on separating the otherwise integrated content. As an example, the encrypted channel module 510 may encrypt eye animation of various subject user representations based on position changes performed via the keyframing. In particular, the encrypted eye animation can cause eye animation to be turned off entirely or for eye movements to be changed such that they do not correspond to user representation interaction with the shared XR environment.

This type of encryption advantageously may address limitations of computational cost by selectively encrypting what is necessary to be encrypted rather than end-to-end encryption of all elements in a particular XR environment being rendered. The selective encryption applied by the encrypted channel module 510 may be automatically applied or configured based on user input. Additionally or alternatively, the encrypted channel module 510 can encrypt communication or content in the environment based on a quantity of user representations or location of a given subject virtual area of the XR environment. For example, a virtual public square accessible to many users/user representations may generally be unencrypted due to a limited expectation of privacy in such a location. Moreover, even a more private virtual area such as semi-public workplace may be generally unencrypted if hundreds of user representations are present because users may not expect private conversations when a relatively high quantity of other user representations are also present. Encrypted channels controlled by the encrypted channel module 510 may be processed with end-to-end encryption to client devices of the remote platform(s) 504.

Conversely, even in such environments that are relatively public and/or have a significant number of user representations, private conversations may be selectively encrypted such as an intimate conversation between two user representations located closely together. Also, a subset of user representations may indicate via user input that their communication or interaction should preferably be confidential. These and other examples of contextual information may be used by the computing platform(s) 502 to determine what portions of the integrated content should be encrypted. As an example, in environments with a high quantity of other user representations, the lips and/or eyes of facial animations of the subset of user representations involved in a confidential conversation may be secured (e.g., subject to a privacy filter, fuzzing, distorting, partial encryption etc.) or may not be visually rendered to safeguard from improper reverse engineering of the confidential content being communicated. Additionally, in such confidential conversations, the corresponding audio or video channel may be encrypted, have words/video segments selectively removed, or not be provided to XR client devices of other user representations in the corresponding XR environment who are not involved in the confidential conversation. In this way, contextual information may be used to determine what portions of the integrated are sensitive and should be subject to encryption or partial safeguarding.

The non-encrypted channel module 512 may implement one or more streams or channels of data or information that are not encrypted. In general, the streams of the non-encrypted channel module 512 (e.g., received, determined, and/or compiled by the non-encrypted channel module 512) may comprise non-sensitive information or data. In some embodiments, the non-sensitive information of non-encrypted channels handled by the non-encrypted channel module 512 can be subject to a privacy filter and/or partial encryption based on correlations to sensitive information, such as determined by the correlation module 514. The non-encrypted channel module 512 may be used to separate portions of any XR or communication environment hosted by the computing platform(s) 502 into non-sensitive portions that are do not pose a significant risk of revealing sensitive or encrypted information. In this way, the functionality of the non-encrypted channel module 512 advantageously may reduce the computational expense and time required to encrypt the entire environment. Non-encrypted channels controlled by the encrypted channel module 510 may be processed on the server side by the computing platform(s) 502.

The correlation module 514 may identify correlations between sensitive and non-sensitive elements in the environment, such as elements of the integrated content being rendered or communicated between user representations in the shared XR environment. In particular, the correlation module 514 may determine non-sensitive/non-encrypted information that is correlated to sensitive/encrypted information based on being capable of revealing information that would compromise the security of the encryption. For example, a malicious actor could use lip reading or other malicious reverse engineering techniques of facial animation of a conversing user representation to discover the content of correlated encrypted audio "uttered" by the conversing user representation. In general, the correlation module 514 can determine correlations between various aspects of the integrated content, such as audio aspects, video aspects, animation aspects, label aspects, location aspects, tagging aspects (e.g., tagged user representations), application aspects (e.g., what type of XR application is being rendered), and XR elements (e.g., a unique XR element created by a particular user). As an example, the location aspects may indicate that a given location is a user representation's home, which may be correlated with a private XR rendered document, so the correlation module 514 may cause a privacy filter such as visual distortion of the rendered document to be applied.

Other selective encryptions based on the correlation module 514 may include selective removal of audio from an audio stream of the integrated content, elimination of user representation mouth/lip movements from an animation stream of the integrated content, blurring a label of an XR element (e.g., a name on a virtual envelope), and/or the like. Such selective encryptions of otherwise unencrypted/non-sensitive elements may be used to enhance the security of other encrypted/sensitive elements from being compromised, such as by malicious actors. The correlations can be automatically determined/selected by the computing platform(s) 502 and/or manually configured or selected by users of the client devices of the remote platform(s) 504. The correlations and/or manually selected correlations by the correlation module 514 may be used for intelligent application of selective encryption. Users have the option of opting out of determination of such correlations, such as based on configuring user preferences or settings that indicate correlation should not be determined.

The recombination module 516 may combine encrypted channels from the encrypted channel module 510 and non-encrypted channels from the non-encrypted channel module 512. As described herein, the encrypted channels may be sent directly to client devices of the remote platform(s) 504 for end-to-end encryption while the non-encrypted channels may be sent first to server(s) of the computing platform(s) 502 for processing (e.g., visual editing, rendering etc.). Due to the different paths taken by the encrypted channels and non-encrypted channels, the recombination module 516 may implement a timing mechanism for properly recombining the channels. Without accurate timing, portions of the integrated content in the environment may unacceptably lag relative to each other. For example, an inaccurate timing mechanism may cause encrypted audio to be out of synchronization with unencrypted aspects of facial animation rendered in the environment. As such, the recombination module 516 may use time stamp exchanges and/or synchronized clocks (or models thereof) to reconcile client side and server sided processing so that the encrypted channels and non-encrypted channels are recombined accurately. In this way, the integrated content may advantageously be separated for selective encryption and later recombined to preserve the accuracy and integrity of the integrated content being rendered or communicated between user representations in the shared XR environment.

An XR module may be used to render the shared artificial reality environment for remote platform(s) 504 via the computing platform(s) 502, for example. The XR module may generate XR representations of navigation or communication actions, such as scrollbars, arrow keys, XR element selections or commands, and/or the like. Such XR representations can be temporarily rendered as XR visual elements or not be rendered at all. The XR module may also cause the user to receive scrolling feedback, such as visual, haptic, or other types of signals to indicate when a particular user command or interaction is being performed. For example, the XR module could cause the wrist wearable 400 or other XR compatible device to vibrate when the user makes a pinch motion to start holding an XR element or another pinch motion to release the XR element. The XR module may also provide XR visual elements that track or indicate the types or other characteristics of input gestures made by users.

In some implementations, the computing platform(s) 502, the remote platform(s) 504, and/or the external resources 524 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 502, the remote platform(s) 504, and/or the external resources 524 may be operatively linked via some other communication media.

A given remote platform 504 may include client computing devices, such as the artificial reality device 302, mobile device 304, tablet 312, personal computer 314, laptop 316, and desktop 318, which may each include one or more processors configured to execute computer program modules (e.g., the instruction modules). The computer program modules may be configured to enable an expert or user associated with the given remote platform 504 to interface with the system 500 and/or external resources 524, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms. The external resources 524 may include sources of information outside of the system 500, external entities participating with the system 500, and/or other resources. For example, the external resources 524 may include externally designed XR elements and/or XR applications designed by third parties. In some implementations, some or all of the functionality attributed herein to the external resources 524 may be provided by resources included in system 500.

The computing platform(s) 502 may include the electronic storage 526, a processor such as the processors 110, and/or other components. The computing platform(s) 502 may include communication lines, or ports to enable the exchange of information with a network and/or other computing platforms. Illustration of the computing platform(s) 502 in FIG. 5 is not intended to be limiting. The computing platform(s) 502 may include a plurality of hardware, software, and/or firmware components operating together to provide the functionality attributed herein to the computing platform(s) 502. For example, the computing platform(s) 502 may be implemented by a cloud of computing platforms operating together as the computing platform(s) 502.

The electronic storage 526 may comprise non-transitory storage media that electronically stores information, such as contextual information including location, quantity of user representations, and correlations. The electronic storage media of the electronic storage 526 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). The electronic storage 526 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 526 may include one or more virtual storage resources (e.g., cloud storage, a virtual private network, and/or other virtual storage resources). The electronic storage 526 may store software algorithms, information determined by the processor(s) 110, information received from computing platform(s) 502, information received from the remote platform(s) 504, and/or other information that enables the computing platform(s) 502 to function as described herein.

The processor(s) 110 may be configured to provide information processing capabilities in the computing platform(s) 502. As such, the processor(s) 110 may include one or more of a digital processor, an analog processor, a digital circuit designed to process information, an analog circuit designed to process information, a state machine, and/or other mechanisms for electronically processing information. Although the processor(s) 110 is shown in FIG. 1 as a single entity, this is for illustrative purposes only. In some implementations, the processor(s) 110 may include a plurality of processing units. These processing units may be physically located within the same device, or the processor(s) 110 may represent processing functionality of a plurality of devices operating in coordination. Processor(s) 110 may be configured to execute modules 508, 510, 512, 514, 516, and/or other modules. Processor(s) 110 may be configured to execute modules 508, 510, 512, 514, 516, and/or other modules by software; hardware; firmware; some combination of software, hardware, and/or firmware; and/or other mechanisms for configuring processing capabilities on the processor(s) 110. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules 508, 510, 512, 514, and/or 516 are illustrated in FIG. 5 as being implemented within a single processing unit, in implementations in which the processor(s) 110 includes multiple processing units, one or more of the modules 508, 510, 512, 514, and/or 516 may be implemented remotely from the other modules. The description of the functionality provided by the different modules 508, 510, 512, 514, and/or 516 described herein is for illustrative purposes, and is not intended to be limiting, as any of the modules 508, 510, 512, 514, and/or 516 may provide more or less functionality than is described. For example, one or more of the modules 508, 510, 512, 514, and/or 516 may be eliminated, and some or all of its functionality may be provided by other ones of the modules 508, 510, 512, 514, and/or 516. As another example, the processor(s) 110 may be configured to execute one or more additional modules that may perform some or all of the functionality attributed below to one of the modules 508, 510, 512, 514, and/or 516.

The techniques described herein may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

Figure 6:
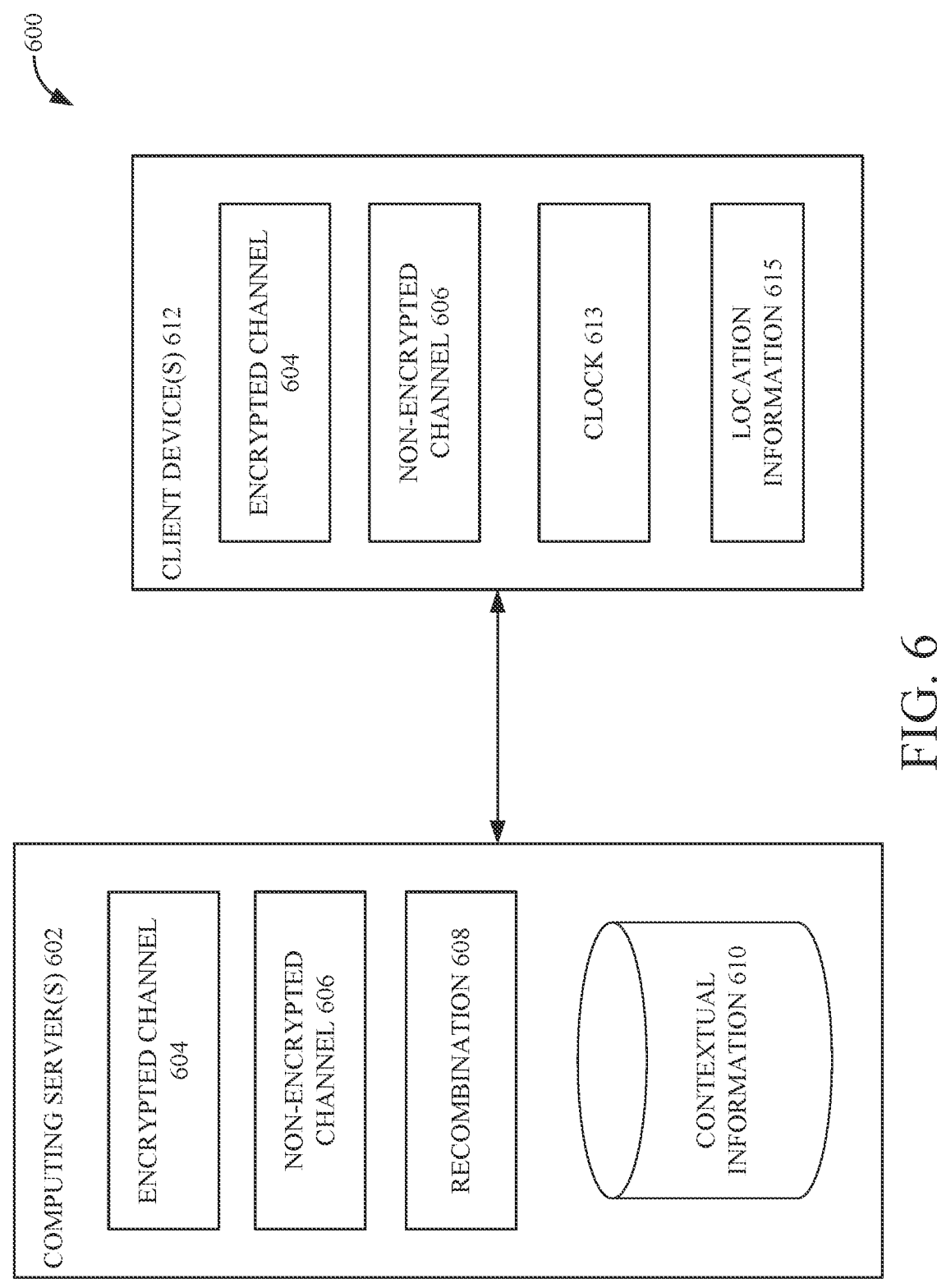
FIG. 6 is a block diagram illustrating an example of recombination of encrypted channels and non-encrypted channels, according to certain aspects of the present disclosure.

FIG. 6 is a block diagram 600 illustrating an example of recombination of encrypted channels and non-encrypted channels, according to certain aspects of the present disclosure. The computing server(s) 602 can be configured to host and provide a computer-based communication environment (e.g., messaging, social network environment) or shared XR environment. The client device(s) 612 can be XR compatible devices for accessing and connecting to the environment. Content can be provided, hosted, rendered, sent, received, or otherwise communicated or generated as integrated content in the environment by the computing server(s) 602. As described herein, such integrated content can be separated or divided into sensitive and non-sensitive aspects, which can be performed based on contextual information. The sensitive and non-sensitive aspects can be encrypted, partially encrypted, or not encrypted. That is, the sensitive and non-sensitive aspects can be selectively encrypted based on the contextual information. As an example, a sensitive user created/possessed element such as an XR artwork element or cryptocurrency XR representation may be considered sensitive based on contextual information indicating the type of element identified in the environment. As such, the computing server(s) 602 may cause the identified element to be end-to-end encrypted at the client device(s) 612. Due to correlation information indicated by the contextual information, animation of eyes of a user representation looking at the identified element in the environment can be blurred or subject to a privacy filter in order to improve the security and encryption (e.g., from unauthorized decryption) of the identified element.

The computing server(s) 602 may include components and/or execute logic to implement modules including the encrypted channel module 604, non-encrypted channel module 606, and recombination module 608. The computing server(s) 602 may also include a database 610 that stores contextual information. The encrypted channel module 604 may involve end-to-end encryption based on sending encrypted channels of portions of the integrated content directly to the client device(s) 612. The encrypted channels can be audio channels, video channels, animation channels (e.g., facial, eye, mouth animations), XR element channels, and/or the like. The non-encrypted channel module 606 can be processed by the computing server(s) 602 prior to being sent to the client device(s) 612. The non-encrypted channels can be audio channels, video channels, animation channels (e.g., facial, eye, mouth animations), XR element channels, and/or the like. Accordingly, the encrypted channels and non-encrypted channels may be sent along different paths (e.g., direct or indirect) to the client device(s) 612, such that a timing mechanism (e.g., based on the clock module 613) may be required for the recombination module 608 to correctly and properly recombine the non-encrypted and encrypted channels. The recombination module 608 may use the timing mechanism to recombine the non-encrypted and encrypted channels while compensating for clock skew resulting from the different paths that the two types of channels take to arrive at the client device(s) 612 so that the channels are recombined at the client device(s) 612. The recombination steps performed by the recombination module 608 can be performed by the computing server(s) 602, the client device(s) 612 or both.

This variation in clock arrival time can be time-varying according to the level of encryption applied and the respective paths used. The recombination module 608 may perform synchronization or re-synchronization according to the clock skew or differences occurring based on different portions of the various encrypted channels and non-encrypted channels being received by the client device(s) 612 which renders and provides connections for users to the shared XR environment. The recombination module 608 can track aspects of the timing mechanism or factors associated with the mechanism such as path timing models/parameters, clock trees, sensitivity, encryption level, and timestamp exchanges. In this way, the recombination module 608 can implement a timing model to address clock skew so that portions of the integrated content are rendered and provided in a synchronized manner regardless of whether they are part of the encrypted channels or non-encrypted channels.

The client device(s) 612 may include components and/or execute logic including the encrypted channel module 604, non-encrypted channel module 606, clock module 613, and location information module 615. Although certain logic described herein are described as being part of or executed by the computing server(s) 602 or the client device(s) 612, the logic could instead be part of or executed by one combined device or by another device including the other instance of the computing server(s) 602 or the client device(s) 612. The clock module 613 and location information module 615 can be used to facilitate synchronization of recombining portions (e.g., sensitive/encrypted and non-sensitive/unencrypted) of the integrated content by the recombination module 608. For example, the location information module 615 can indicate where (e.g., what virtual area or environment or other communication environment) a subject is located relative to the shared environment. For example, the indication can be indicative of how many user representations are located in the subject location of the shared environment as well as other characteristics of the subject location such as purpose, relationship to XR application, constituent components within, theme, configured settings, etc. The location information module 615 may be used to indicate the subject location and quantity of user representations located within the subject location to the computing server(s) 602 so that the recombination module 608 can recombine the encrypted channels or non-encrypted channels according to the varying encryption applied based on the subject location and quantity.

As discussed herein, the varying encryption can be applied based on other types of contextual information. The contextual information may be stored in electronic storage, such as in the database 610 of the computing server(s) 602. The contextual information can include location, actions being taken, features of a user representation, types or identities of XR elements in the XR environment, types of or mechanisms used for content being communicated, correlations between sensitive and non-sensitive elements (e.g., non-encrypted elements that may be improperly used to reveal information about related encrypted elements), type of hardware device, type of software being executed, type of virtual environment involved, identities of user representations involved, and/or the like. For example, correlations may include correlations between non-sensitive information such as a rendered XR visual theme or smell of a virtual space with the location of the virtual space or a correlation between a rendered XR visual label of an XR object with the identity of the XR object (e.g., the label of a virtual letter rendered in the virtual space).

The clock module 613 can output timing or clock adjustments or characteristics based on the varying encryption being applied. For example, there may be relatively high clock skew or delay depending on a relatively high quantity of user representations involved in communication or content being rendered or communicated in the environment. As an example, the need to encrypt relatively more audio, facial expressions (e.g., moving lips, eye contact) of XR rendered user representations, or more complex XR elements may result in a relatively greater clock adjustment being made by the clock module 613. This may be because greater processing power or time required to encrypt more elements of the environment may result in the encrypted channels requiring more time before being received by the client device(s) 612. Additionally or alternatively, non-encrypted channels may have relatively longer arrival times based on being XR locations with more complicated XR elements to render corresponding to relatively longer processing times by the computing server(s) 602.

Figure 7:
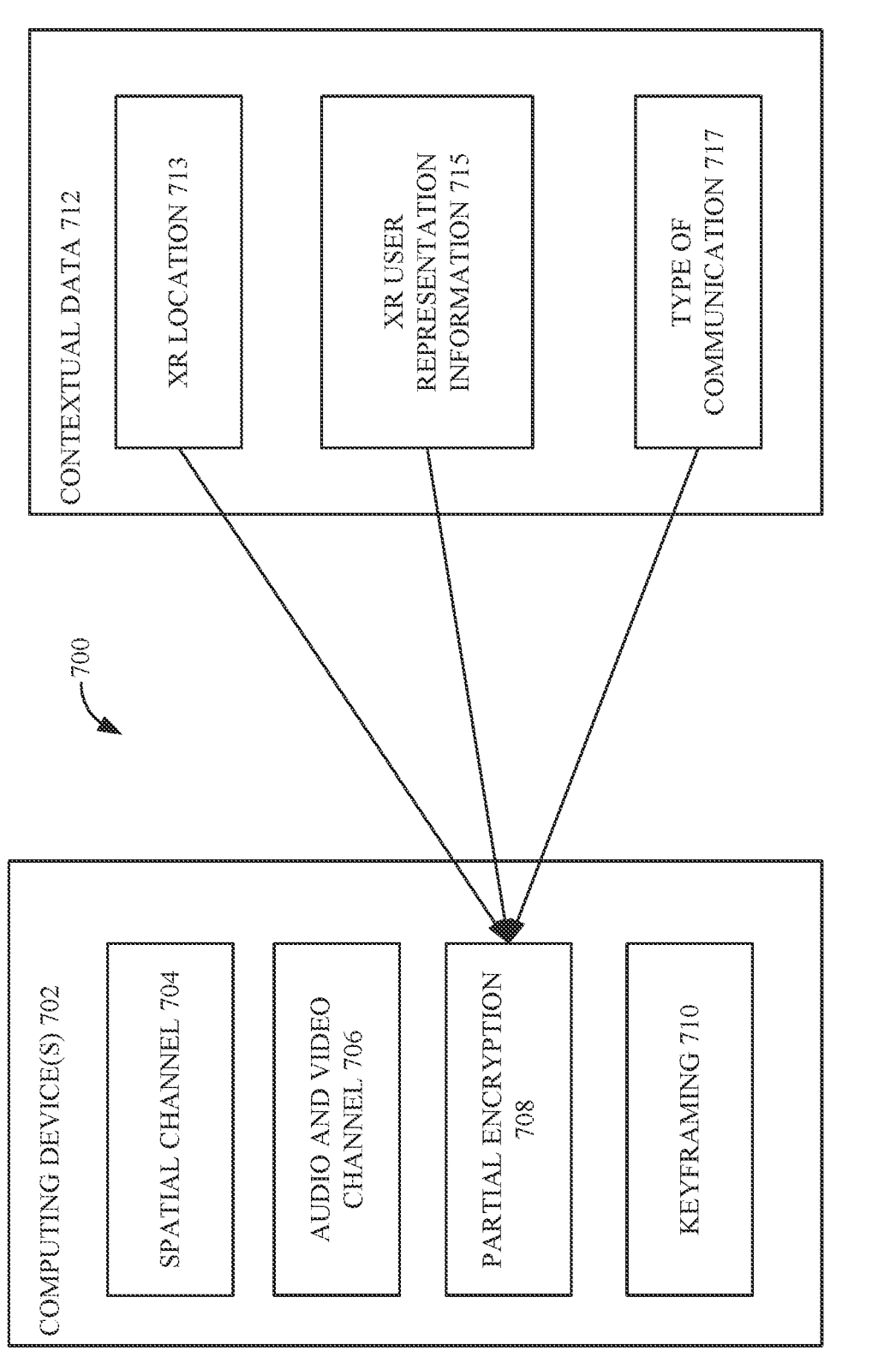
FIG. 7 is a block diagram illustrating an example of partial encryption, according to certain aspects of the present disclosure.

FIG. 7 is a block diagram 700 illustrating an example of partial encryption in a shared artificial reality environment or other communication environment, according to certain aspects of the present disclosure. The partial encryption can be performed by computing device(s) 702 based on contextual data 712. The contextual data 712 may include XR location 713, XR user representation information 715, and type of communication information 717. The computing device(s) 702 may include components and/or execute logic to implement modules including the spatial channel module 704, audio and video channel module 706, partial encryption module 708, and keyframing module 710. Although certain logic described herein are described as being part of or executed by the computing device(s) 702, the logic could instead be part of or executed by another remote device. As described herein, the computing device(s) 702 may advantageously dynamically apply selective encryption based on context, which can be reflected by the contextual data 712.

The selective encryption may be applied by separating integrated content rendered by or communicated in the environment into sensitive and non-sensitive portions. As an example, when the XR location 713 indicates that a subject environment is a XR rendering of a virtual workspace, the computing device(s) 702 may selectively encrypt audio between user representations that indicate their conversation should be relatively more private, such as by removing certain audio from an audio stream of the conversation when the corresponding user input indicates that the audio is "whispered" in XR or is intended to be relatively private. As an example, when the XR location 713 indicates that the subject environment is an XR rendering of a public space, the computing device(s) 702 may generally not apply encryption, but may encrypt the animation of sensitive/confidential XR objects such as private virtual documents, letter, and/or the like located in the public space. The XR user representation information 715 which indicates a quantity of user representations present in the subject environment may be another example of contextual data 712 used by the partial encryption module 708 to determine how to selectively encrypt the subject environment.

As an example, if there are a significant number of user representations in the subject environment such as five hundred, the computing device(s) 702 could bypass applying encryption to conversations with such a quantity of user representations. As an example, if there are a relatively low number of user representations in the subject environment such as ten, then the partial encryption module 708 (with spatial channel module 704 and audio and video channel module 706) may apply selective or partial encryption to audio, video, and/or animation corresponding to sensitive aspects of conversations. For example, the partial encryption module 708 and audio and video channel module 706 could apply selective encryption by encrypting only the audio speech on the client side since such encryption may involve a relatively low computer processing cost in comparison with spatial and video encryption. Moreover, the partial encryption module 708 may apply partial encryption such as a privacy filter (e.g., visual fuzzing, distorting. XR element replacement) to non-sensitive elements in non-encrypted channels that are correlated with sensitive elements in encrypted channels, as discussed herein. For example, to safeguard against discovery of sensitive/encrypted audio speech information by a malicious actor, the partial encryption module 708 and spatial channel module 704 may blur or visually distort XR representations of eye movements of the user representations involved in the conversation.

Furthermore, the partial encryption module 708 may replace an XR representation of a moving user representation of mouth/lips with a static image. In this way, the function of the partial encryption module 708 may reduce computational costs and time by selective encryption rather than encrypting all of audio, video, and animation. The selective encryption can protect against the malicious actor analyzing correlated non-sensitive elements to discover encrypted information. That is, the partial encryption module 708 can apply the privacy filter or partial encryption to otherwise non-encrypted facial animation that is correlated with encrypted voice channels of the conversation. The partial encryption module 708 can apply different types of encryption to different information based on the contextual data 712 including correlations. For example, the partial encryption module 708 and spatial channel module 704 can encrypt mouth animation, eye animation, and/or hand gestures for each user representation involved in the conversation for selective encryption based on the contextual data 712. Moreover, the partial encryption module 708 can encrypt or partially encrypt the distance between the user representations involved and hand gestures used in the conversation based on the contextual data 712, which can indicate data such as the content of the conversation, the non-verbal communication used in the conversation, the identity and location of the involved user representations, and/or the like.

In this way, the partial encryption module 708 may advantageously increase the efficiency of encrypting the environment based on the reduced computing cost of selective encryption. The partial encryption module 708 may also advantageously increase the security of encryption by protecting against actions by malicious actors to discover encrypted information via otherwise non-encrypted elements in the environment. The spatial channel module 704 may analyze the contextual data 712 (assuming users have opted-in to determination of contextual data 712) and other information for determining whether and/or what portions of spatial features such as facial animation should be partially or selectively encrypted. The audio and video channel module 706 may analyze the contextual data 712 and other information for determining whether and/or what portions of audio and video content (e.g., conversation voice audio, rendered videos, etc.) should be partially or selectively encrypted. As an example, the contextual data 712 can indicate that video content being played back in the environment which could reveal sensitive information such as an application or environment location as well as identities of involved user representations should be partially or selectively encrypted by the audio and video channel module 706 and partial encryption module 708. The selective encryption being used can be automatically applied (e.g., based on analysis by the computing device(s) 702 which could include execution of machine learning or artificial intelligence) or can be manually applied by selection via user input.

The keyframing module 710 may be used for selective encryption of video content and spatial content in the XR environment, such as by the spatial channel module 704, audio and video channel module 706, and the partial encryption module 708. The keyframing module 710 may identify different features of a spatial or video XR element for indexing encryption or privacy filter actions. For example, the keyframing module 710 can determine keyframes as markers or anchor points for encryption or privacy filter actions such as distorting mouth animations of talking user representations with mouth movements that does not mirror the audio speech of the talking user representations. For example, the determined keyframes can be used to change eye contact and/or distance between conversing user representations and/or XR elements to maintain confidential/encrypted information, such as the identity of the XR elements or user representations. The keyframing module 710 can determine keyframe interpolations for performing the privacy filter or partial encryption actions. The keyframes or markers of the keyframing module 710 may also be used to index or facilitate separation of integrated content being rendered or communicated in the environment into sensitive/encrypted channels and non-sensitive/non-encrypted channels. The selective encryption as described herein can adjust for variations over time. That is, selective encryption can be applied differently (e.g., automatic or manual adjustments) to different environments or change in the same environment, such as based on contextual data 712 changing. For example, if the quantity of user representations in a particular environment increases beyond a threshold, the quality or quantity of selective encryption may be reduced. For example, user representations may indicate (e.g., via their XR compatible client devices) that information being communicated has changed to confidential subject matter so that more selective encryption should be applied. Moreover, the selective encryption applied may be limited by technical limits on hardware or software capability of clients, servers, and/or other XR compatible devices. The selective encryption described herein may advantageously improve XR computing systems by encrypting only elements being decrypted or elements that are at risk of being decrypted/compromised.

Figure 8:
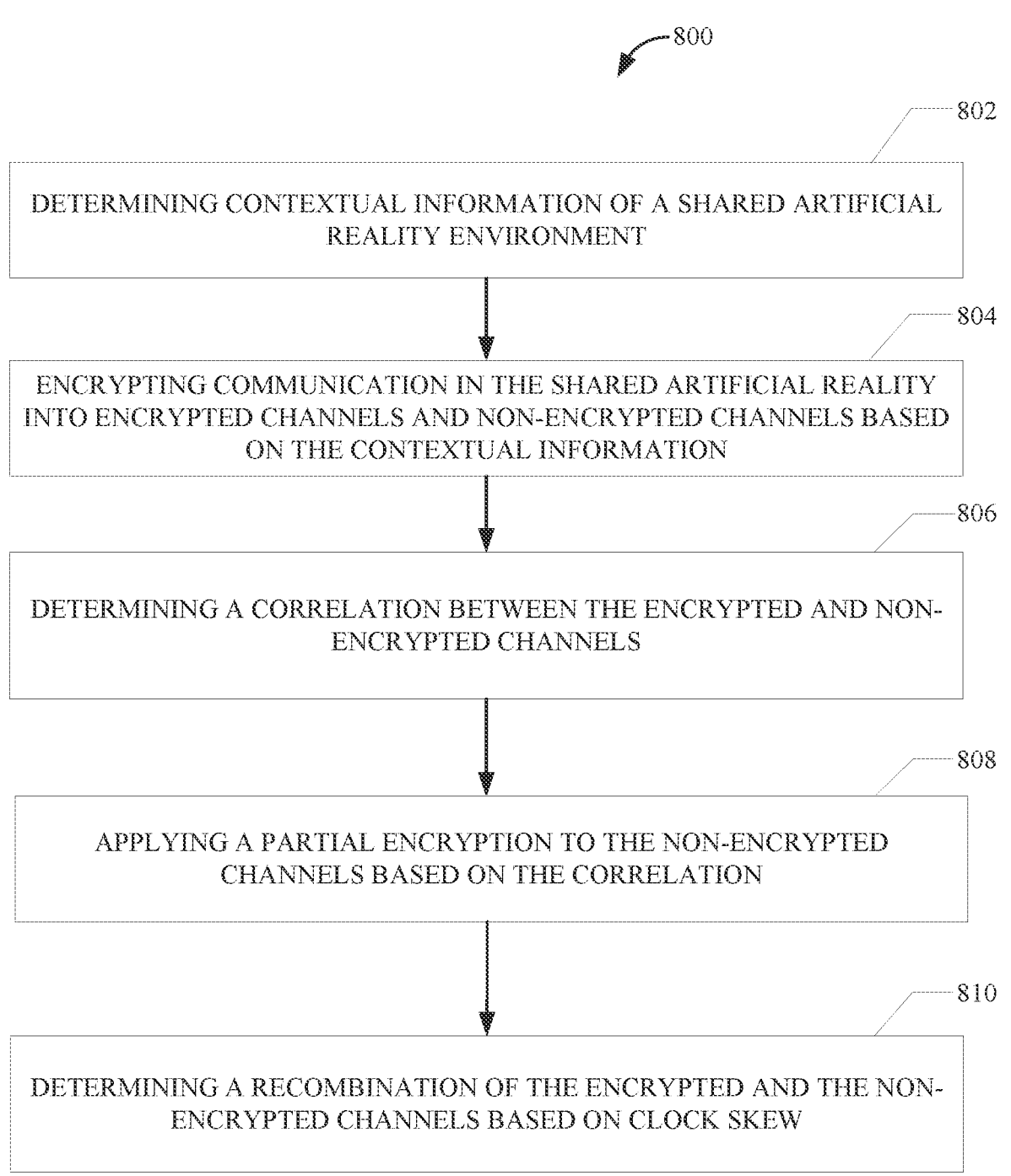
FIG. 8 is an example flow diagram for selective encryption in a shared artificial reality environment, according to certain aspects of the present disclosure.

FIG. 8 illustrates an example flow diagram (e.g., process 800) for selective encryption in a shared artificial reality environment, according to certain aspects of the disclosure. For explanatory purposes, the example process 800 is described herein with reference to one or more of the figures above. Further for explanatory purposes, the steps of the example process 800 are described herein as occurring in serial, or linearly. However, multiple instances of the example process 800 may occur in parallel. For purposes of explanation of the subject technology, the process 800 will be discussed in reference to one or more of the figures above.

At step 802, contextual information of the shared artificial reality environment may be determined. According to an aspect, determining the contextual information comprises determining at least one of: device status of an artificial reality compatible device, a power level associated with the artificial reality environment, a connectivity status, a user preference, a user parameter, or an artificial reality characteristic. According to an aspect, determining the contextual information comprises receiving a user input indicative of a portion of the shared artificial reality environment being a private artificial reality environment. For example, the contextual information may be determined based on the quantity of user representations or a location in the shared artificial reality environment. At step 804, communication in the shared artificial reality environment into encrypted channels and non-encrypted channels may be encrypted based on the contextual information. According to an aspect, encrypting the communication in the shared artificial reality environment comprises encrypting the communication in the shared artificial reality environment based on the quantity of user representations or a location corresponding to the contextual information. According to an aspect, encrypting the communication in the shared artificial reality environment comprises determining a level of encryption for each virtual object of a plurality of virtual objects within the shared artificial reality environment.

At step 806, a correlation between the encrypted channels and the non-encrypted channels may be determined. According to an aspect, determining the correlation between the encrypted channels and non-encrypted channels comprises determining confidential components and non-confidential components of an event in the shared artificial reality environment. At step 808, a partial encryption to the non-encrypted channels for obscuring a cryptographic code of the communication may be applied based on the correlation. According to an aspect, applying the partial encryption comprises obscuring elements of the non-encrypted channels that reveal the cryptographic code or information about an encrypted element of the encrypted channels. At step 810, a recombination of the encrypted channels and the non-encrypted channels may be determined based on clock skew. According to an aspect, determining the recombination of the encrypted channels and the non-encrypted channels comprises determining, by a client device, a timing parameter for synchronized combination of the encrypted channels and the non-encrypted channels.

According to an aspect, the process 800 may further include synchronizing encrypted audio or rendered virtual objects from the encrypted channels with non-encrypted audio or rendered virtual objects from the non-encrypted channels. According to an aspect, the process 800 may further include sending speech channels from a server for the shared artificial reality environment to a client device, wherein the speech channels comprise the encrypted channels and non-encrypted channels. According to an aspect, the process 800 may further include determining the quantity of user representations or location within the shared artificial reality environment. According to an aspect, the process 800 may further include identifying, via the correlation, sensitive spatial or audio information in the non-encrypted channels. According to an aspect, the process 800 may further include applying, based on the correlation, the partial encryption to the sensitive spatial or audio information of the non-encrypted channels for obscuring the cryptographic code of the communication.

Figure 9:
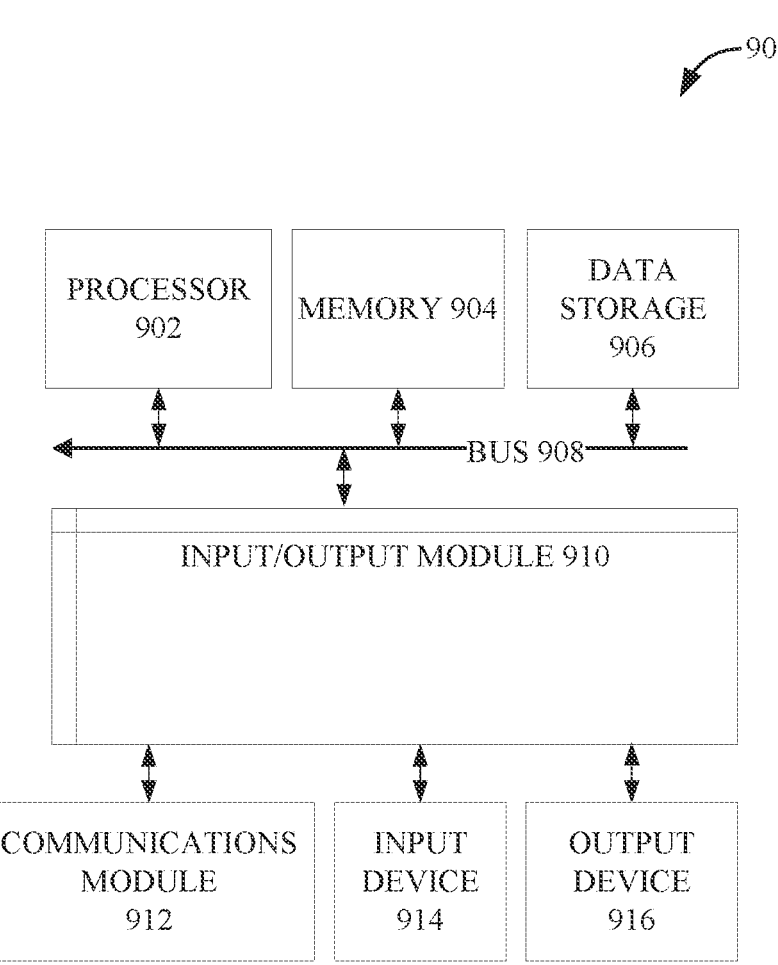
FIG. 9 is a block diagram illustrating an example computer system with which aspects of the subject technology can be implemented.

FIG. 9 is a block diagram illustrating an exemplary computer system 900 with which aspects of the subject technology can be implemented. In certain aspects, the computer system 900 may be implemented using hardware or a combination of software and hardware, either in a dedicated server, integrated into another entity, or distributed across multiple entities.

The computer system 900 (e.g., server and/or client) includes a bus 908 or other communication mechanism for communicating information, and a processor 902 coupled with the bus 908 for processing information. By way of example, the computer system 900 may be implemented with one or more processors 902. Each of the one or more processors 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 900 can include, in addition to hardware, code that creates an execution environment for the computer program in question, e.g., code that constitutes processor firmware, a protocol stack, a database management system, an operating system, or a combination of one or more of them stored in an included memory 904, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer-readable medium for execution by, or to control the operation of, the computer system 900, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by the processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 900 further includes a data storage device 906 such as a magnetic disk or optical disk, coupled to bus 908 for storing information and instructions. The computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 and/or an output device 916. Exemplary input devices 914 include a keyboard and a pointing device, e.g., a mouse or a trackball, by which a user can provide input to the computer system 900. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 916 include display devices such as an LCD (liquid crystal display) monitor, for displaying information to the user.

According to one aspect of the present disclosure, the above-described systems can be implemented using a computer system 900 in response to the processor 902 executing one or more sequences of one or more instructions contained in the memory 904. Such instructions may be read into memory 904 from another machine-readable medium, such as data storage device 906. Execution of the sequences of instructions contained in the main memory 904 causes the processor 902 to perform the process steps described herein. One or more processors in a multi-processing arrangement may also be employed to execute the sequences of instructions contained in the memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 900 can include clients and servers. A client and server are generally remote from each other and typically interact through a communication network. The relationship of client and server arises by virtue of computer programs running on the respective computers and having a client-server relationship to each other. The computer system 900 can be, for example, and without limitation, a desktop computer, laptop computer, or tablet computer. The computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 902 for execution. Such a medium may take many forms, including, but not limited to, non-volatile media, volatile media, and transmission media. Non-volatile media include, for example, optical or magnetic disks, such as the data storage device 906. Volatile media include dynamic memory, such as the memory 904. Transmission media include coaxial cables, copper wire, and fiber optics, including the wires that comprise the bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 900 reads XR data and provides an artificial reality, information may be read from the XR data and stored in a memory device, such as the memory 904. Additionally, data from the memory 904 servers accessed via a network, the bus 908, or the data storage 906 may be read and loaded into the memory 904. Although data is described as being found in the memory 904, it will be understood that data does not have to be stored in the memory 904 and may be stored in other memory accessible to the processor 902 or distributed among several media, such as the data storage 906.

The techniques described herein may be implemented as method(s) that are performed by physical computing device (s); as one or more non-transitory computer-readable storage media storing instructions which, when executed by computing device(s), cause performance of the method(s); or as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A. B, and C.

To the extent that the terms "include." "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for selective encryption in a shared artificial reality environment, the method comprising:

determining contextual information of the shared artificial reality environment, including determining at least one of: a status of an artificial reality compatible device, a power level associated with the artificial reality environment, and/or a connectivity status and adjusting a level of the selective encryption based on the determined device status, power level, and/or connectivity status;

encrypting, using the adjusted level of selective encryption, communication in the shared artificial reality environment into encrypted channels and non-encrypted channels based on the contextual information, wherein encrypting communication is based on a quantity of user representations and comprises determining a level of encryption for each virtual object of a plurality of virtual objects within the shared reality environment;

determining a first correlation between the encrypted channels and the non-encrypted channels;

determining a change in the contextual information of the shared artificial reality environment;

determining, based on the change in the contextual information, a second correlation between the encrypted channels and the non-encrypted channels;

applying, based on the second correlation, a partial encryption to the non-encrypted channels for obscuring a cryptographic code of the communication, wherein applying the partial encryption comprises determining key frames associated with the second correlation to define a beginning and an end of the partial encryption; and determining a recombination of the encrypted channels and the non-encrypted channels based on clock skew, wherein the clock skew depends on both the quantity of user representations involved in the communication and a complexity of content rendered within the non-encrypted channels.

2. The computer-implemented method of claim 1, wherein determining the contextual information comprises determining at least one of: a user preference, a user parameter, or an artificial reality characteristic.

3. The computer-implemented method of claim 1, wherein determining the contextual information comprises receiving a user input indicative of a portion of the shared artificial reality environment being a private artificial reality environment.

4. The computer-implemented method of claim 1, wherein encrypting the communication in the shared artificial reality environment comprises:

encrypting the communication in the shared artificial reality environment based on a location corresponding to the contextual information.

5. The computer-implemented method of claim 1, wherein determining the first correlation between the encrypted channels and the non-encrypted channels comprises determining confidential components and non-confidential components of an event in the shared artificial reality environment.

6. The computer-implemented method of claim 1, wherein applying the partial encryption comprises obscuring information about an encrypted element of the encrypted channels.

7. The computer-implemented method of claim 1, wherein determining the recombination of the encrypted channels and the non-encrypted channels comprises determining, by a client device, a timing parameter for synchronized combination of the encrypted channels and the non-encrypted channels.

8. The computer-implemented method of claim 1, further comprising synchronizing encrypted audio or rendered virtual objects from the encrypted channels with non-encrypted audio or rendered virtual objects from the non-encrypted channels.

9. The computer-implemented method of claim 1, further comprising sending speech channels from a server for the shared artificial reality environment to a client device, wherein the speech channels comprise the encrypted channels and the non-encrypted channels.

10. The computer-implemented method of claim 1, further comprising:

determining a location within the shared artificial reality environment;

identifying, via the second correlation, sensitive spatial or audio information in the non-encrypted channels; and applying, based on the second correlation, the partial encryption to the sensitive spatial or audio information of the non-encrypted channels.

11. A system for navigating through a shared artificial reality environment, comprising:

one or more processors; and a memory comprising instructions stored thereon, which when executed by the one or more processors, causes the one or more processors to perform:

determining A) a quantity of user representations or location within the shared artificial reality environment and B) at least one of: a status of an artificial reality compatible device, a power level associated with the artificial reality environment, and/or a connectivity status;

determining, based on the quantity of the user representations or location, contextual information of the shared artificial reality environment;

adjusting a level of encryption based on the determined device status, power level, and/or connectivity status;

encrypting, using the adjusted level of encryption, communication in the shared artificial reality environment into encrypted channels and non-encrypted channels based on the contextual information wherein encrypting communication is based on a quantity of user representations and comprises determining a level of encryption for each virtual object of a plurality of virtual objects within the shared artificial reality environment;

determining a first correlation between the encrypted channels and the nonencrypted channels;

determining a change in the contextual information of the shared artificial reality environment;

determining, based on the change in the contextual information, a second correlation between the encrypted channels and the non-encrypted channels;

applying, based on the second correlation, a partial encryption to the non-encrypted channels for obscuring a cryptographic code of the communication, wherein applying the partial encryption comprises determining key frames associated with the second correlation to define a beginning and an end of the partial encryption; and determining a recombination of the encrypted channels and the non-encrypted channels based on clock skew, wherein the clock skew depends on both the quantity of user representations involved in the communication and a complexity of content rendered within the non-encrypted channels.

12. The system of claim 11, wherein the instructions that cause the one or more processors to perform determining the contextual information cause the one or more processors to perform:

determining at least one of: a user preference, a user parameter, or an artificial reality characteristic; and receiving a user input indicative of a portion of the shared artificial reality environment being a private artificial reality environment.

13. The system of claim 11, wherein the instructions that cause the one or more processors to perform determining the first correlation between the encrypted channels and the non-encrypted channels cause the one or more processors to perform determining confidential components and nonconfidential components of an event in the shared artificial reality environment.

14. The system of claim 11, wherein the instructions that cause the one or more processors to perform applying the partial encryption cause the one or more processors to perform obscuring information about an encrypted element of the encrypted channels.

15. The system of claim 11, wherein the instructions that cause the one or more processors to perform determining the recombination of the encrypted channels and the non-encrypted channels cause the one or more processors to perform determining, by a client device, a timing parameter for synchronized combination of the encrypted channels and the non-encrypted channels.

16. The system of claim 11, further comprising stored sequences of instructions, which when executed by the one or more processors, cause the one or more processors to perform synchronizing encrypted audio or rendered virtual objects from the encrypted channels with non-encrypted audio or rendered virtual objects from the non-encrypted channels.

17. The system of claim 11, further comprising stored sequences of instructions, which when executed by the one or more processors, cause the one or more processors to perform sending speech channels from a server for the shared artificial reality environment to a client device, wherein the speech channels comprise the encrypted channels and the non-encrypted channels.

18. The system of claim 11, further comprising stored sequences of instructions, which when executed by the one or more processors, cause the one or more processors to perform:

identifying, via the second correlation, sensitive spatial or audio information in the non-encrypted channels; and applying, based on the second correlation, the partial encryption to the sensitive spatial or audio information of the non-encrypted channels.

19. A non-transitory computer-readable storage medium comprising instructions stored thereon, which when executed by one or more processors, cause the one or more processors to perform operations for navigating through a shared artificial reality environment, comprising:

determining A) a quantity of user representations or location within the shared artificial reality environment and B) at least one of: a status of an artificial reality compatible device, a power level associated with the artificial reality environment, and/or a connectivity status;

determining, based on the quantity of the user representations or location, contextual information of the shared artificial reality environment;

adjusting a level of encryption based on the determined device status, power level, and/or connectivity status;

encrypting, using the adjusted level of encryption, communication in the shared artificial reality environment into encrypted channels and non-encrypted channels based on the contextual information wherein encrypting communication is based on quantity of user representations and comprises determining a level of encryption for each virtual object of plurality of virtual objects within the shared artificial reality environment;

determining a first correlation between the encrypted channels and the non-encrypted channels;

determining a change in the contextual information of the shared artificial reality environment;

determining, based on the change in the contextual information, a second correlation between the encrypted channels and the non-encrypted channels;

identifying, via the second correlation, sensitive spatial or audio information in the non-encrypted channels;

applying, based on the second correlation, a partial encryption to the sensitive spatial or audio information of the non-encrypted channels for obscuring a cryptographic code of the communication, wherein applying the partial encryption comprises determining key frames associated with the second correlation to define a beginning and an end of the partial encryption; and determining a recombination of the encrypted channels and the non-encrypted channels based on clock skew, wherein the click skew depends on both the quantity of user representations involved in the communication and a complexity of content rendered within the non-encrypted channels.

* * * * *